United States Patent
Zhang et al.

(10) Patent No.: US 10,009,621 B2
(45) Date of Patent: Jun. 26, 2018

(54) ADVANCED DEPTH INTER CODING BASED ON DISPARITY OF DEPTH BLOCKS

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 14/290,603

(22) Filed: May 29, 2014

(65) Prior Publication Data

US 2014/0355666 A1 Dec. 4, 2014

Related U.S. Application Data

(60) Provisional application No. 61/829,919, filed on May 31, 2013.

(51) Int. Cl.
| | | |
|---|---|---|
| H04N 7/12 | (2006.01) | |
| H04N 19/52 | (2014.01) | |
| H04N 19/597 | (2014.01) | |
| H04N 19/593 | (2014.01) | |
| H04N 19/61 | (2014.01) | |

(52) U.S. Cl.
CPC ............ *H04N 19/52* (2014.11); *H04N 19/593* (2014.11); *H04N 19/597* (2014.11); *H04N 19/61* (2014.11)

(58) Field of Classification Search
CPC ..................................................... H04N 19/52
USPC .................................................... 375/240.02
See application file for complete search history.

(56) References Cited

U.S. PATENT DOCUMENTS

| | | | |
|---|---|---|---|
| 2009/0324059 A1 | 12/2009 | Boughorbel | |
| 2014/0241434 A1* | 8/2014 | Lin ...................... | H04N 19/597 375/240.16 |
| 2014/0341291 A1* | 11/2014 | Schwarz .............. | H04N 19/597 375/240.16 |

(Continued)

FOREIGN PATENT DOCUMENTS

| | | |
|---|---|---|
| CN | 101512601 A | 8/2009 |
| JP | 2013078097 A | 4/2013 |
| WO | 2013053309 A1 | 4/2013 |

OTHER PUBLICATIONS

Wiegand et al., "WD1: Working Draft 1 of High-Efficiency Video Coding," JCTVC-C403, 3rd Meeting: Guangzhou, CN, Oct. 7-15, 2010, 137 pp.

(Continued)

*Primary Examiner* — Richard Torrente
(74) *Attorney, Agent, or Firm* — Shumaker & Sieffert, P.A.

(57) ABSTRACT

In one example, the disclosure is directed to techniques that include, for each prediction unit (PU) of a respective coding unit (CU) of a slice of a picture of the video data, determining at least one disparity value based at least in part on at least one depth value of at least one reconstructed depth sample of at least one neighboring sample. The techniques further include determining at least one disparity vector based at least in part on the at least one disparity value, wherein the at least one disparity vector is for the respective CU for each PU. The techniques further include reconstructing, based at least in part on the at least one disparity vector, a coding block for the respective CU for each PU.

30 Claims, 11 Drawing Sheets

(56) References Cited

U.S. PATENT DOCUMENTS

| | | | |
|---|---|---|---|
| 2015/0245049 A1* | 8/2015 | Lee | H04N 19/597 375/240.16 |
| 2015/0264397 A1* | 9/2015 | Lin | H04N 19/597 375/240.16 |
| 2015/0382019 A1* | 12/2015 | Chen | H04N 19/597 348/43 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, CH, Nov. 21-30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Tech et al., "3D-HEVC Test Model 3," Joint Collaborative Team on 3D Video Coding Extension Development of ITU-T SG 16 WP 3 and ISO/IEC JTC 1/SC 29/WG 11, Document: JCT3V-C1005_spec_d1, Jan. 17-23, 2013, 91 pp.

Chang, et al.,"3D-HEVC HLS: Camera Parameter Signaling and Depth Reference Selection" JCT-3V Meeting; Apr. 20-26, 2013; Incheon; (The Joint Collaborative Team on 3D Video Coding Extension Development of ISO/IEC JTC1/SC29/WG11 and ITU-T SG.16); No. JCT3v-D0140, XP03013080, 10 pp.

Zhang, et al., "3D-CE5.h related: Disparity vector derivation for multiview video and 3DV", MPEG Meeting; Apr.-May 2012; Geneva; (Motion Picture Expert Group or ISO/IEC JTC1/SC29/WG11),, No. m24937, XP030053280, 6 pp.

Zhang, et al., "CE5.h: Disparity vector generation results", JCT2-A0097, JCT-3V Meeting; MPEG Meeting; Jul. 16-20, 2012; Stockholm; (The Joint Collaborative Team on 3D Video Coding Extension Development of ISO/IEC JTC1/SC29/WG11 and ITU-T SG.16); URL: http://phenix.int-evry.fr/jct2/, XP030130096, 5 pp.

Sung, et al., "3D-CE5.h: Simplification of disparity vector derivation for HEVC-based 3D video coding", JCT-3V Meeting; MPEG Meeting; Jul. 16-20, 2012; Stockholm; (The Joint Collaborative Team on 3D Video Coding Extension Development of ISO/IECJTC1/SC29/WG11 and ITU-T SG.16); URL: http://phenix.int-evry.fr/jct2/, No. JCT3V-A0126, XP030130125, 4 pp.

Kang, et al., "3D-CE5.h related: Improvements for disparity vector derivation", JCT-3V Meeting; MPEG Meeting; Oct. 13-19, 2012; Shanghai; (The Joint Collaborative Team on 3D Video Coding Extension Development of ISO/IEC JTC1/SC29/WG11 and ITU-T SG.16); URL: http://phenix.int-evry.fr/jct2/, No. JCT3V-B0047, XP030130228, 4 pp.

International Search Report and Written Opinion from International Application No. PCT/US2014/040272, dated Sep. 26, 2014, 13 pp.

Response to Written Opinion dated Sep. 26, 2014, from International Application No. PCT/US2014/040272, filed on Mar. 18, 2015, 6 pp.

Second Written Opinion from International Application No. PCT/US2014/040272, dated Apr. 22, 2015, 7 pp.

Response to Second Written Opinion dated Apr. 22, 2015, from International Application No. PCT/US2014/040272, filed on Jun. 22, 2015, 22 pp.

International Preliminary Report on Patentability from International Application No. PCT/US2014/040272, dated Jul. 7, 2015, 9 pp.

International Preliminary Report on Patentability from International Application No. PCT/US2014/040272, dated Aug. 19, 2015, 9 pp.

Chuang T-D., et al., "Non-CE9: Division-free MV scaling", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G223, Nov. 8, 2011 (Nov. 8, 2011), pp. 1-6, XP030110207.

Shimizu S., et al., "Description of Core Experiment 1 (CE1) on View Synthesis Prediction," Joint Collaborative Team on 3D Video Coding Extensions of ITU-T SG 16 WP 3 and ISO/IEC JTC 1/SC 29/WG 11 4th Meeting: Incheon, KR, JCT3V-D1101, Apr. 20-26, 2013, URL:http://phenix.it-sudparis.eu/jct2/doc_end_user/documents/4_Incheon/wg11/JCT3V-D1101-v1.zip, Apr. 26, 2013, 6 pages.

Thirumalai V., et al., "CE5.h: Merge candidates derivation from vector shifting," 4. JCT-3V Meeting; Apr. 20, 2013-Apr. 26, 2013; Incheon; (The Joint Collaborative Team on 3D Video Coding Extension Development of ISO/IEC JTC1/SC29/WG11 and ITU-T SG.16); No. JCT3V-D0178, Apr. 13, 2013 (Apr. 13, 2013), pp. 1-5, XP030130842, URL: http://phenix.int-evry.fr/jct2/, the whole document.

* cited by examiner

ADVANCED DEPTH INTER CODING BASED ON DISPARITY OF DEPTH BLOCKS

This application claims the benefit of U.S. Provisional Application No. 61/829,919, filed on May 31, 2013, the entire content of which is incorporated herein by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames. Reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views, e.g., from multiple perspectives. Some three-dimensional (3D) video standards that have been developed, or are under development, make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure is related to 3D video coding based on advanced codecs, including the coding of two or more views plus depth with the 3D-HEVC codec. Specifically, this disclosure describes techniques related to disparity vectors for depth view coding.

In one example, this disclosure describes a method of decoding video data. For each prediction unit (PU) of a respective coding unit (CU) of a slice of a picture of the video data, the method for decoding video data includes determining at least one disparity value based at least in part on at least one depth value of at least one reconstructed depth sample of at least one neighboring sample. Further, the method includes determining at least one disparity vector based at least in part on the at least one disparity value, wherein the at least one disparity vector is for the respective CU. The method also includes reconstructing, based at least in part on the at least one disparity vector, a coding block for the respective CU.

In another example, the disclosure is directed to a video coding device that comprises a memory configured to store data associated with a picture and one or more processors in communication with the memory and configured to, for each PU of a respective CU of a slice of a picture of the video data, the one or more processors are configured to determine at least one disparity value based at least in part on at least one depth value of at least one reconstructed depth sample of at least one neighboring sample. Further, the one or more processors are configured to determine at least one disparity vector based at least in part on the at least one disparity value, wherein the at least one disparity vector is for the respective CU. The one or more processors are also configured to reconstruct, based at least in part on the at least one disparity vector, a coding block for the respective CU.

In another example, the disclosure is directed to a computer-readable storage medium having instructions stored thereon that, when executed, configure a video decoding device to perform techniques in accordance with this disclosure. For each PU of a respective CU of a slice of a picture of the video data, the instructions configure a video decoding device to determine at least one disparity value based at least in part on at least one depth value of at least one reconstructed depth sample of at least one neighboring sample. Further, the instructions configure a video decoding device to determine at least one disparity vector based at least in part on the at least one disparity value, wherein the at least one disparity vector is for the respective CU. The instructions also configure a video decoding device to reconstruct, based at least in part on the at least one disparity vector, a coding block for the respective CU.

In another example, this disclosure describes a method of encoding video data. For each PU of a respective CU of a slice of a picture of the video data, the method includes determining at least one disparity value based at least in part on at least one depth value of at least one reconstructed depth sample of at least one neighboring sample. The method also includes determining at least one disparity vector based at least in part on the at least one disparity value, wherein the at least one disparity vector is for the respective CU. The method also includes generating, based at least in part on the at least one disparity vector, an encoded representation of a coding block for the respective CU.

In another example, the disclosure is directed to a video coding device that comprises one or more processors. For each PU of a respective CU of a slice of a picture of the video data, the one or more processors are configured to determine at least one disparity value based at least in part on at least one depth value of at least one reconstructed depth sample of at least one neighboring sample. Further, the one or more processors are configured to determine at least one disparity vector based at least in part on the at least one disparity value, wherein the at least one disparity vector is for the respective CU. The one or more processors are also configured to generate, based at least in part on the at least one disparity vector, an encoded representation of a coding block for the respective CU.

In another example, the disclosure is directed to a computer-readable storage medium having instructions stored thereon that, when executed, configure a video encoding device to perform techniques in accordance with this disclosure. For each PU of a respective CU of a slice of a picture of the video data, the instructions configure a video decoding device to determine at least one disparity value based at least in part on at least one depth value of at least one reconstructed depth sample of at least one neighboring sample. Further, the instructions configure a video decoding device to determine at least one disparity vector based at least in part on the at least one disparity value, wherein the at least one disparity vector is for the respective CU. The instructions also configure a video decoding device to generate, based at least in part on the at least one disparity vector, an encoded representation of a coding block for the respective CU.

The details of one or more examples of the disclosure are set forth in the accompanying drawings and the description below. Other features, objects, and advantages will be apparent from the description, drawings, and claims.

DETAILED DESCRIPTION

Figure 1:
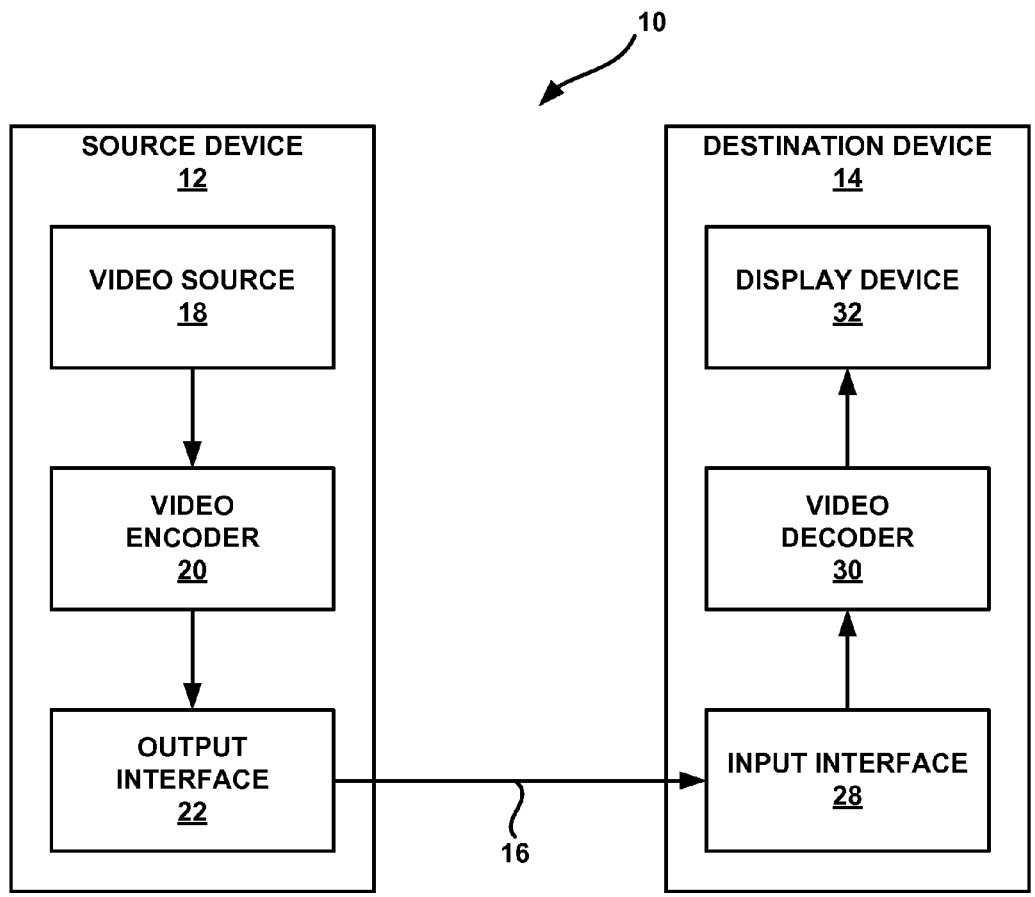
FIG. 1 is a block diagram illustrating an example video coding system that may utilize the techniques described in this disclosure.

Depth coding in 3D-HEVC is built on top of HEVC coding and disparity compensation, which is typical motion compensation that utilizes an inter-view reference picture. To better represent the depth information, in 3D-HEVC intra coding, several enhancement depth coding tools are applied. The enhancement depth coding tools all allowing separating of depth blocks into non-rectangular partitions. Such partition-based depth intra coding modes including Depth Modeling Modes (DMM), Region Boundary Chain (RBC) coding and Simplified Depth Coding (SDC). In DMM, RBC or SDC, each depth PU can be divided as one or two parts, and each part is represented by a constant value, i.e., DC value. The DC value for each partition is predicted using neighboring reference samples and a residual value may be further coded to compensate the prediction error.

Although both DMM and RBC methods partition a depth PU into two parts, they differ on the representation of the partitioning pattern. In DMM, two types of partitioning patterns are applied, including the wedgelet and contour patterns. A wedgelet pattern segments a depth PU with a certain straight line. Different from wedglet, RBC represents the partitioning pattern explicitly using a series of connected chains, and each chain may be a connection of one sample and one of its eight-connectivity samples, indexed from 0 to 7, and a contour pattern can support partition a depth PU into two irregular partitions, each of which may contain separate sub-regions. The partition of contour of a depth block may be calculated by analyzing the co-located texture. Moreover, different methods for signaling the partitioning pattern are utilized in wedglet modes, including 1) explicit signaling a wedgelet pattern index selected from a pre-defined set of wedgelet patterns; 2) predicting the current wedgelet pattern using neighboring intra prediction mode and wedgelet pattern; and 3) deriving the partitioning pattern based on the reconstructed co-located texture block.

Motion Parameter Inheritance (MPI) has been implemented by modifying the merge candidate list generation. One additional merge candidate, which may be generated from the motion information of the co-located texture block, may be added into the merge list of the current depth block, in addition to the original spatial and temporal candidates produced by the HEVC merge mode.

Advanced inter-view coding schemes are not applied to depth coding. In depth coding, it may be less accurate and higher complex to utilize neighbor-based disparity vector derivation (NBDV) scheme, used in texture coding, to derive the disparity vector. Therefore, techniques described in this disclosure generate a disparity vector for the current depth block from one or more reconstructed depth samples in neighboring blocks. The derived disparity vector may be utilized for advanced inter-view coding tools, including inter-view motion prediction and advanced residual prediction.

The disparity vector derivation for a depth block can occur at a PU level or a CU level. In CU-level disparity vector derivation, for all PUs of the CU, a depth value of one of the reconstructed depth samples in neighboring blocks of the coding unit (CU) covering the current PU may be utilized to be converted to a disparity vector to a corresponding block of a given reference view. The conversion from disparity value to disparity vector may be based on the camera parameters. Multiple disparity vectors, each corresponding to a reference view may be derived.

For example, in determining the at least one disparity value, a system may determine two or more disparity values based at least in part on two or more neighboring samples of the respective PU. In determining the at least one disparity vector based at least in part on the at least one disparity value, the system may determine two or more disparity vectors based at least in part on the two or more disparity values. The top-left sample of the PU has the coordinates (x, y), and the two or more reconstructed depth samples are from at least two or more of a top neighboring row of the PU, a left neighboring column of the PU, any sample located at a special neighboring block of the respective PU, a sample with coordinates (x−1, y+1), a sample with coordinates (x+1, y−1), and, when the PU size is denoted by W×H, a sample with coordinates (x−1, y+H−1) and a sample with coordinates (x+W−1, y−1).

The neighboring samples of the CU covering the PU may be selected as follows. The coordinates of the top-left sample within the CU covering the current PU may be denoted as (x, y). In one example, the top-left neighboring sample of the CU covering the current PU may be selected. The top-left neighboring sample has coordinates of (x−1, y−1). Additionally, any sample located at the top neighboring row or the left neighboring column of the CU covering current PU may be used. Further, any sample located at the spatial neighboring blocks of the CU covering current PU may be used.

Alternatively, when the current PU is being coded, more than one available neighboring samples of the CU covering the current PU may be used to derive one or more disparity vectors for the current PU. For example, another top sample, with coordination (x, y−1) and another left sample with coordinates (x−1, y) may be used. Additionally, a sample with coordinates of (x−1, y+1) or (x+1, y−1) may be used. When the CU size may be denoted by 2N×2N, any sample with coordinates of (x−1, y+2N−1) and (x+2N−1, y−1) may be used. Further, any sample of the top neighboring row, left neighboring column, or any samples of the spatial neighboring blocks of the CU covering current PU may be used.

For example, in determining the at least one disparity value, a system may determine two or more disparity values based at least in part on two or more neighboring samples of the respective CU. The top-left sample of the respective CU has the coordinates (x, y), and the two or more reconstructed depth samples are from at least two or more of a top-left neighboring sample of the respective CU, a top neighboring row of the respective CU, a left neighboring column of the respective CU, any sample located at a special neighboring block of the respective CU, a sample with coordinates (x−1, y+1), a sample with coordinates (x+1, y−1), and, when the respective CU size is denoted by 2N×2N, a sample with coordinates (x−1, y+2N−1) and a sample with coordinates (x+2N−1, y−1).

Alternatively, when the current PU is being coded, one or more available neighboring samples of the largest CU (LCU) covering current PU may be used to derive one or more disparity vectors for the current PU. In some examples, any of the above-described samples may be used for the LCU.

For PU-level disparity vector derivation, for each PU, depth value of one of the reconstructed depth samples in neighboring blocks may be utilized to be converted to a disparity vector to a corresponding block of a given reference view. The conversion from disparity value to disparity vector may be based on the camera parameters. Multiple disparity vectors, each corresponding to a reference view may be derived.

FIG. 1 is a block diagram illustrating an example video coding system 10 that may utilize the techniques described in this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding may be performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

Techniques of this disclosure may be performed by elements of a video encoder, such as video encoder 20. In this technique, for each prediction unit of a respective coding unit of a slice of a picture of video data, video encoder 20 may determine at least one disparity value based at least in part on at least one depth value of at least one reconstructed depth sample of at least one neighboring sample. Video encoder 20 may determine at least one disparity vector based at least in part on the at least one disparity value, wherein the at least one disparity vector is for the respective coding unit. Video encoder 20 may generate an encoded representation of a coding block for the respective coding unit based at least in part on the at least one disparity vector.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Techniques of this disclosure may be performed by elements of a video decoder, such as video decoder 30. For each prediction unit of a respective coding unit of a slice of a picture of video data, video decoder 30 may determine at least one disparity value based at least in part on at least one depth value of at least one reconstructed depth sample of at least one neighboring sample. Video decoder 30 may determine at least one disparity vector based at least in part on the at least one disparity value, wherein the at least one disparity vector is for the respective coding unit. Video decoder 30 may reconstruct a coding block for the respective coding unit based at least in part on the a least one disparity vector.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as when storing syntax elements to a computer-readable storage medium, such as, e.g., a storage medium remotely accessible via a file server or streaming server or a locally accessible storage device, in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any legal bitstream conforming to MVC-based 3DV always contain a sub-bitstream that may be compliant to a MVC profile, e.g., stereo high profile. A joint draft of the MVC extension of H.264/AVC is described in "Advanced video coding for generic audio visual services," ITU-T Recommendation H.264, March 2010. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual.

In the example of FIG. 1, video encoder 20 and video decoder 30 may operate according to the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A draft of the upcoming HEVC standard, referred to as "HEVC Working Draft 10" is described in Bross et al., "High Efficiency Video Coding (HEVC) text specification draft 10," Joint Collaborative Team on Video Coding (JCT-VC) of ITU-T SG16 WP3 and ISO/IEC JTC1/SC29/WG11, 12$^{th}$ Meeting, Geneva, Switzerland, January 2013, which as of May 31, 2013, is available from http://phenix.it-sudparis.eu/jct/doc_end_user/documents/12_Geneva/wg11/JCTVC-L1003-v34.zip.

Furthermore, there are ongoing efforts to produce scalable video coding, multi-view coding, and 3DV extensions for HEVC. The SVC extension of HEVC may be referred to as SHEVC. The 3DV extension of HEVC may be referred to as HEVC-based 3DV or 3D-HEVC. 3D-HEVC is based, at least in part, on solutions proposed in Schwarz et al, "Description of 3D Video Coding Technology Proposal by Fraunhofer HHI (HEVC compatible configuration A), ISO/IEC JTC1/SC29/WG11, Doc. MPEG11/M22570, Geneva, Switzerland, November/December 2011, hereinafter "m22570" and Schwarz et al, "Description of 3D Video Coding Technology Proposal by Fraunhofer HHI (HEVC compatible configuration B), ISO/IEC JTC1/SC29/WG11, Doc. MPEG11/M22571, Geneva, Switzerland, November/December 2011, hereinafter "m22571." A reference software description for 3D-HEVC is available at Schwarz et al, "Test Model under Consideration for HEVC based 3D video coding," ISO/IEC JTC1/SC29/WG11 MPEG2011/N12559, San Jose, USA, February 2012. Reference software, namely HTM version 3.0 is available, as of May 31, 2013, from https://hevc.hhi.fraunhofer.de/svn/svn_3DVCSoftware/tags/HTM-3.0/.

In H.264/AVC, HEVC, and other video coding standards, a video sequence may include a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

In H.264/AVC, each picture may be partitioned into a set of macroblocks (MBs). A macroblock is a 16×16 block of luma samples and two corresponding blocks of chroma samples of a picture that has three sample arrays, or a 16×16 block of samples of a monochrome picture or a picture that is coded using three separate color planes.

Video encoder 20 may encode macroblocks using inter predictor or intra prediction. When video encoder 20 encodes a macroblock using inter prediction, video encoder 20 generates one or more predictive blocks for the macroblock based on samples of one or more pictures other than the current picture (i.e., the picture containing the macroblock). A macroblock encoded using inter prediction may be referred to as an inter macroblock. When video encoder 20 encodes a macroblock using intra prediction, video encoder 20 generates one or more predictive blocks for the macroblock based on samples in the current picture. A macroblock encoded using intra prediction may be referred to as an intra macroblock.

In H.264/AVC, each inter macroblock may be partitioned in four different ways: One 16×16 macroblock partition, two 16×8 macroblock partitions, two 8×16 macroblock partitions, or four 8×8 macroblock partitions.

Different MB partitions in one MB may have different reference index values for each direction (i.e., RefPicList0 or RefPicList1). When an MB is not partitioned into four 8×8 MB partitions, the MB may have only one motion vector for the whole MB partition in each direction.

When an MB is partitioned into four 8×8 MB partitions, each 8×8 MB partition can be further partitioned into sub-blocks. There are four different ways to get sub-blocks from an 8×8 MB partition: One 8×8 sub-block, two 8×4 sub-blocks, two 4×8 sub-blocks, or four 4×4 sub-blocks.

Each sub-block can have a different motion vector in each direction. How an 8×8 MB partition is partitioned into sub-clocks are named sub-block partition.

As mentioned above, multi-view coding (MVC) is an extension of H.264/AVC. In multi-view coding, there may be multiple views of the same scene from different viewpoints. The term "access unit" is used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier.

The Joint Collaboration Team on 3D Video Coding (JCT-3C) of VCEG and MPEG is developing a 3DV standard based on HEVC, for which part of the standardization efforts includes the standardization of the multiview video codec based on HEVC (MV-HEVC) and another part for 3D Video coding based on HEVC (3D-HEVC). For 3D-HEVC, new coding tools, including those in coding unit/prediction unit level, for both texture and depth views may be included and supported. The latest software 3D-HTM for 3D-HEVC (3D-HTM version 6.0) is available as of May 31, 2013 at https://hevc.hhi.fraunhofer.de/svn/svn_3DVCSoftware/tags/HTM-6.0/.

The latest reference software description as well as the working draft of 3D-HEVC is available as of May 31, 2013 at http://phenix.it-sudparis.eu/jct2/doc_end_user/documents/3_Geneva/wg11/JCT3V-C1005-v2.zip. Gerhard Tech, Krzysztof Wegner, Ying Chen, Sehoon Yea, "3D-HEVC Test Model 3," JCT3V-C1005_spec_d1, Joint Collaborative Team on 3D Video Coding Extension Development of ITU-T SG 16 WP 3 and ISO/IEC JTC1/SC 29/WG11, 3rd Meeting: Geneva, CH, 17-23 Jan. 2013.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs), macroblocks, macroblock partitions, and so on.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive sample blocks for the PU. Moreover, when using uni-prediction, video encoder 20 may generate a single motion vector that indicates a spatial displacement between a prediction block of the PU and the reference location. To indicate the spatial displacement between a prediction block of the PU and the reference location, a motion vector may include a horizontal component specifying a horizontal displacement between the prediction block of the PU and the reference location and may include a vertical component specifying a vertical displacement between the prediction block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first MV indicating a spatial displacement between a sample block of the PU and the first reference location and a second MV indicating a spatial displacement between the prediction block of the PU and the second reference location.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. The video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encoding syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. An RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

When a video coder (e.g., video encoder 20 or video decoder 30) begins coding a current slice of a picture, the video coder may initialize a first reference picture list (i.e., List 0). Furthermore, if the current slice is a B slice, the video coder may initialize a second reference picture list (i.e., List 1). This disclosure may refer to List 0 as "RefPicList0" and may refer to List 1 as "RefPicList1." After a video coder has initialized a reference picture list (e.g., List 0 or List 1), the video coder may modify the order of the reference pictures in the reference picture list. In other words, the video coder may perform a reference picture list modification (RPLM) process. The video coder may modify the order of the reference pictures in any order, including the case where one particular reference picture may appear in more than one position in the reference picture list.

In some cases, video encoder 20 may signal the motion information of a PU using merge mode or advanced motion vector prediction (AMVP) mode. In other words, in HEVC, there are two modes for the prediction of motion parameters, one being the merge mode and the other being AMVP. The motion information of a PU may include motion vector(s) of the PU and reference index(es) of the PU. When video encoder 20 signals the motion information of a current PU using merge mode, video encoder 20 generates a merge candidate list (i.e., a motion vector predictor (MVP) candidate list). In other words, video encoder 20 may perform a motion vector predictor list construction process. The merge candidate list includes a set of merge candidates (i.e., MVP candidates). The merge candidate list may include merge candidates that indicate the motion information of PUs that spatially or temporally neighbor the current PU. That is, in the merge mode, a candidate list of motion parameters (e.g., reference indexes, motion vectors, etc.) is constructed where a candidate can be from spatial and temporal neighboring blocks.

Furthermore, in merge mode, video encoder 20 may select a merge candidate from the merge candidate list and may use the motion information indicated by the selected merge candidate as the motion information of the current PU. Video encoder 20 may signal the position in the merge candidate list of the selected merge candidate. For instance, video encoder 20 may signal the selected motion vector parameters by transmitting an index into the candidate list. Video decoder 30 may obtain, from the bitstream, the index into the candidate list (i.e., a candidate list index). In addition, video decoder 30 may generate the same merge candidate list and may determine, based on the indication of the position of the selected merge candidate, the selected merge candidate. Video decoder 30 may then use the motion information of the selected merge candidate to generate predictive blocks for the current PU. That is, video decoder 30 may determine, based at least in part on the candidate list index, a selected candidate in the candidate list, wherein the selected candidate specifies the motion vector for the current PU. In this way, at the decoder side, once the index is decoded, all motion parameters of the corresponding block where the index points are to be inherited by the current PU.

Skip mode is similar to merge mode. In skip mode, video encoder 20 and video decoder 30 generate and use a merge candidate list in the same way that video encoder 20 and video decoder 30 use the merge candidate list in merge mode. However, when video encoder 20 signals the motion information of a current PU using skip mode, video encoder 20 does not signal any residual data for the current PU. Accordingly, video decoder 30 may use, as a predictive block for the PU, a reference block indicated by the motion information of a selected candidate in the merge candidate list.

AMVP mode is similar to merge mode in that video encoder 20 generates a candidate list and selects a candidate from the list of candidates. However, when video encoder 20 signals the motion information of a current PU using AMVP mode, video encoder 20 also may signal a motion vector difference (MVD) for the current PU and a reference index in addition to signaling a position of the selected candidate in the candidate list. An MVD for the current PU may indicate a difference between a motion vector of the current PU and a motion vector of the selected candidate from the AMVP candidate list. In uni-prediction, video encoder 20 may signal one MVD and one reference index for the current PU. In bi-prediction, video encoder 20 may signal two MVDs and two reference indexes for the current PU. In this way, video encoder 20 may signal the selected motion vectors by transmitting an index into the candidate list and may signal the reference index values and MVDs. In other words, the data in the bitstream representing the motion vector for the current PU may include data representing a reference index, an index to a candidate list, and an MVD.

Furthermore, when the motion information of a current PU is signaled using AMVP mode, video encoder 30 may obtain, from the bitstream, a MVD for a current PU and a candidate list index. Video decoder 30 may generate the same AMVP candidate list and may determine, based on the indication of the position of the selected candidate in the AMVP candidate list, the selected candidate. Video decoder 30 may recover a motion vector of the current PU by adding a MVD to the motion vector indicated by the selected candidate. That is, video decoder 30 may determine, based at least in part on a motion vector indicated by the selected candidate and the MVD, the motion vector of the current PU. Video decoder 30 may then use the recovered motion vector or motion vectors of the current PU to generate predictive blocks for the current PU.

A candidate in a merge candidate list or an AMVP candidate list that is based on the motion information of a PU that temporally neighbors a current PU (i.e., a PU that is in a different time instance than the current PU) may be referred to as a temporal motion vector predictor (TMVP). TMPV is used to improve the coding efficiency of HEVC and is different from other coding tools. To determine a TMVP, a video coder may firstly identify a reference picture that includes a PU that is co-located with the current PU. That is, the video coder accesses the motion vector of a frame in a decoded picture buffer, more specifically in a reference picture list. In other words, the video coder may identify a co-located picture.

In an inter predicted slice, when the TMVP is enabled for the whole coded video sequence (sps_temporal_mvp_enable_flag in sequence parameter set is set to 1), video encoder 20 may signal slice_temporal_mvp_enable_flag in the slice header to indicate whether TMVP is enabled for the current slice.

If the current slice of the current picture is a B slice (i.e., a slice that is allowed to include bi-directionally inter predicted PUs), video encoder 20 may signal, in a slice header, a syntax element (e.g., collocated_from_l0_flag) that indicates whether the co-located picture is from RefPicList0 or RefPicList1. After a video decoder 30 identifies the reference picture list that includes the co-located picture, video decoder 30 may use another syntax element (e.g., collocated_ref_idx), which may be signaled in a slice header, to identify a picture (i.e., the co-located picture) in the identified reference picture list.

A video coder may identify a co-located PU by checking the co-located picture. The TMVP may indicate either the motion information of a right-bottom PU of the CU containing the co-located PU, or the motion information of the right-bottom PU within the center PUs of the CU containing this PU. The right-bottom PU of the CU containing the co-located PU may be a PU that covers a location immediately below and right of a bottom-right sample of a prediction block of the PU. In other words, the TMVP may indicate the motion information of a PU that is in the reference picture and that covers a location that is co-located with a bottom right corner of the current PU, or the TMVP may indicate the motion information of a PU that is in the reference picture and that covers a location that is co-located with a center of the current PU.

When motion vectors identified by the above process are used to generate a motion candidate for merge mode or AMVP mode, the motion vectors may be scaled based on the temporal location (reflected by POC value). For instance, a video coder may increase the magnitude of a motion vector by greater amounts when a difference between the POC values of a current picture and a reference picture is greater than when a difference between the POC values of the current picture and the reference picture is less.

3D-HEVC provides for multiple views of the same scene from different viewpoints. Part of the standardization efforts for 3D-HEVC includes the standardization of the multiview video codec based on HEVC. Similarly, in HEVC based 3DV, inter-view prediction based on the reconstructed view components from different views is enabled. Like MVC in H.264/AVC, 3D-HEVC supports inter-view motion prediction (IMP). In 3D-HEVC, IMP is similar to the motion compensation used in standard HEVC and may utilize the same or similar syntax elements. However, when a video coder performs IMP on a PU, the video coder may use, as a reference picture, a picture that is in the same access unit as the PU, but in a different view. In contrast, conventional motion compensation only uses pictures in different access units as reference pictures. Thus, in 3D-HEVC, the motion parameters of a block in a dependent view are predicted or inferred based on already coded motion parameters in other views of the same access unit.

A video coder may generate a candidate list (e.g., a merge candidate list or an AMVP candidate list) when the motion information of a current PU is signaled using merge mode or AMVP mode. In 3D-HEVC, the candidate list may include an inter-view prediction candidate that may be used in the same manner as other candidates in the candidate list. The inter-view prediction candidate specifies the motion information of a PU (i.e. a reference PU) of a reference picture. The reference picture may be in the same access unit as the current PU, but is in a different view than the current PU. To determine the reference PU, the video coder may perform a disparity vector construction process to determine a disparity vector for the current PU. The disparity vector for the current PU may indicate a horizontal spatial displacement between the current PU and a location within the reference texture picture. The reference PU may be the PU of the reference texture picture that covers the location indicated by the disparity vector.

A disparity motion vector is a motion vector pointing to a location within an inter-view reference picture. An inter-view reference picture is a texture picture that is in the same access unit as a current PU, but in a different view. A spatial disparity vector ("SDV") is a disparity motion vector of a PU that spatially neighbors the current PU. In other words, a SDV is a motion vector that is specified by a spatially-neighboring PU and that indicates a location in an inter-view reference picture, where the spatially-neighboring PU spatially neighbors a current PU. A temporal disparity vector ("TDV") is a disparity motion vector of a PU co-located with the current PU, in the same view as the current PU, and in a different access unit than the current PU. In other words, a TDV may be a disparity motion vector from co-located PU, co-located LCU in any reference picture or inter-view picture with the same access unit. Alternatively, if the motion vector of the co-located PU from the picture used for TMVP or the motion vector generated by TMVP is a disparity vector, it is also treated as a TDV. If a spatially-neighboring or a temporally-neighboring PU of the current PU is coded using inter-view motion prediction, the disparity vector of the spatially-neighboring or temporally-neighboring PU is an implicit disparity vector ("IDV").

The video coder may use the selected disparity vector from SDVs, TDVs, or IDVs directly for IMP. As indicated above, a video encoder may generate MVP candidate lists for the current PU when signaling the motion information of the current PU using merge/skip mode or AMVP mode. The video coder may use the disparity vector specified by the selected disparity vector candidate to determine a reference PU in an inter-view reference picture. The video coder may then include the motion information of the reference PU as the inter-view prediction MV candidate in the MV candidate lists for merge mode or AMVP mode.

The syntax element part_mode specifies a partitioning mode of a current CU. The value of part_mode in HEVC is restricted as follows. If the coding mode of one CU is equal to MODE_INTRA, part_mode shall be equal to 0 or 1. Otherwise, if the coding mode of one CU is equal to MODE_INTER, the following applies. If the size of the current CU is greater than the size of a smallest CU and asymmetric motion partition is enabled, part_mode shall be in the range of 0 to 2, inclusive and in the range of 4 to 7, inclusive. Otherwise, if the size of the current CU is greater than the size of the smallest CU and asymmetric motion partition is disabled, part_mode shall be in the range of 0 to 2, inclusive. Otherwise, if the size of the current CU is equal to 8, the value of part_mode shall be in the range of 0 to 2, inclusive. Otherwise (the size of current CU is greater than 8), the value of part_mode shall be in the range of 0 to 3, inclusive.

The relationship between part_mode and the associated value of the variable PartMode is defined in the following Table 1. Note, when part_mode is not present, the partition mode of the current CU is inferred to be equal to PART_2N× 2N.

TABLE 1

Name association to prediction mode and partitioning type

| The coding mode of one CU | part_mode | PartMode |
| --- | --- | --- |
| MODE_INTRA | 0 | PART_2N × 2N |
|  | 1 | PART_N × N |
| MODE_INTER | 0 | PART_2N × 2N |
|  | 1 | PART_2N × N |
|  | 2 | PART_N × 2N |
|  | 3 | PART_N × N |
|  | 4 | PART_2N × nU |
|  | 5 | PART_2N × nD |
|  | 6 | PART_nL × 2N |
|  | 7 | PART_nR × 2N |

NBDV is used for a disparity vector derivation method in the 3D-HEVC that uses the texture-first coding order for all the views. In the current 3D-HEVC design, the NBDV is also used to retrieve a depth data from reference view's depth map.

A disparity vector is used for an estimator of the disparity between two views. Because neighboring blocks share almost the same motion/disparity information in video coding, the current block can use the motion vector information in neighboring blocks as a good predictor. Following this idea, the NBDV uses the neighboring disparity information for estimating the disparity vector in different views.

Several spatial and temporal neighboring blocks are firstly defined. Each of them is then checked in a pre-defined order determined by the priority of the correlation between the current block and the candidate block. Once a disparity motion vector (i.e., the motion vector points to an inter-view reference picture) is found in the candidates, the disparity motion vector is converted to a disparity vector. Two sets of neighboring blocks are utilized. One set is from spatial neighboring blocks and the other set is from temporal neighboring blocks.

3D-HEVC firstly adopted the NBDV method proposed in L. Zhang et al., "3D-CE5.h: Disparity vector generation results," document JCT3V-A0097. Implicit disparity vectors were included with a simplified NBDV in J. Sung et al., "3D-CE5.h: Simplification of disparity vector derivation for HEVC-based 3D video coding," document JCT3V-A0126. In J. Kang et al., "3D-CE5.h related: Improvements for disparity vector derivation," document no. JCT3V-B0047, the NBDV is further simplified by removing the implicit disparity vectors stored in the decoded picture buffer, but also improved a coding gain with the RAP picture selection.

Figure 2:
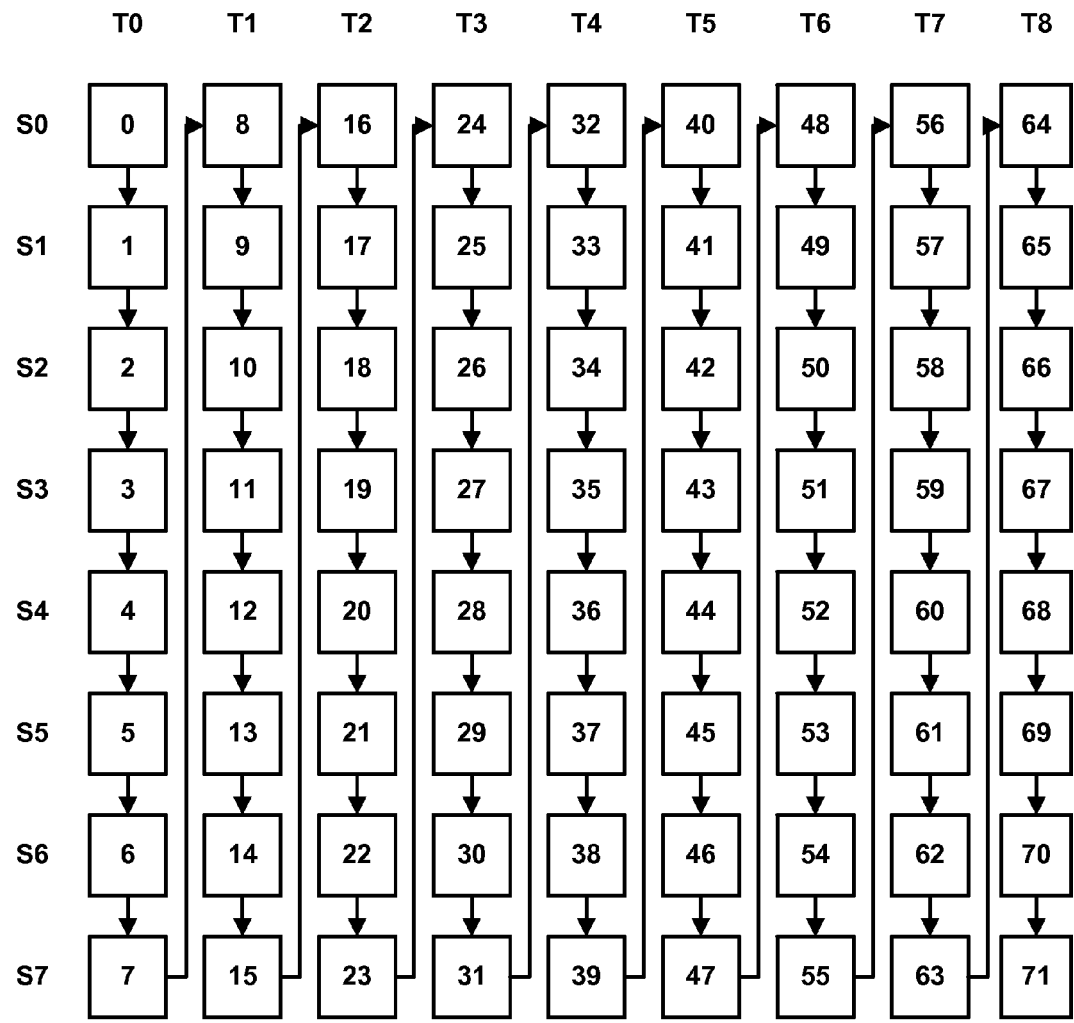
FIG. 2 is a conceptual diagram illustrating an example multi-view coding decoding order.

FIG. 2 is a conceptual diagram illustrating an example multi-view coding decoding order. In the example of FIG. 2, each square corresponds to a view component. Columns of squares correspond to access units. Each access unit may be defined to contain the coded pictures of all the views of a time instance. Rows of squares correspond to views. In the example of FIG. 2, the access units are labeled T0 . . . T8 and the views are labeled S0 . . . S8. Because each view component of an access unit is decoded before any view component of the next access unit, the decoding order of FIG. 2 may be referred to as time-first coding. The decoding order of access units may not be identical to the output or display order of the views.

Multi-view coding supports inter-view prediction. Inter-view prediction is similar to the inter prediction used in H.264/AVC, HEVC, or other video coding standards and may use similar syntax elements. However, when a video coder performs inter-view prediction on a current video unit (such as a macroblock), the video coder may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list (e.g., RefPicList0 or RefPicList1) if the picture is in a different view but within a same time instance (i.e. access unit) as the picture that the video coder is currently coding. Like other inter prediction reference pictures, the video coder may insert an inter-view prediction reference picture at any position of a reference picture list.

Figure 3:
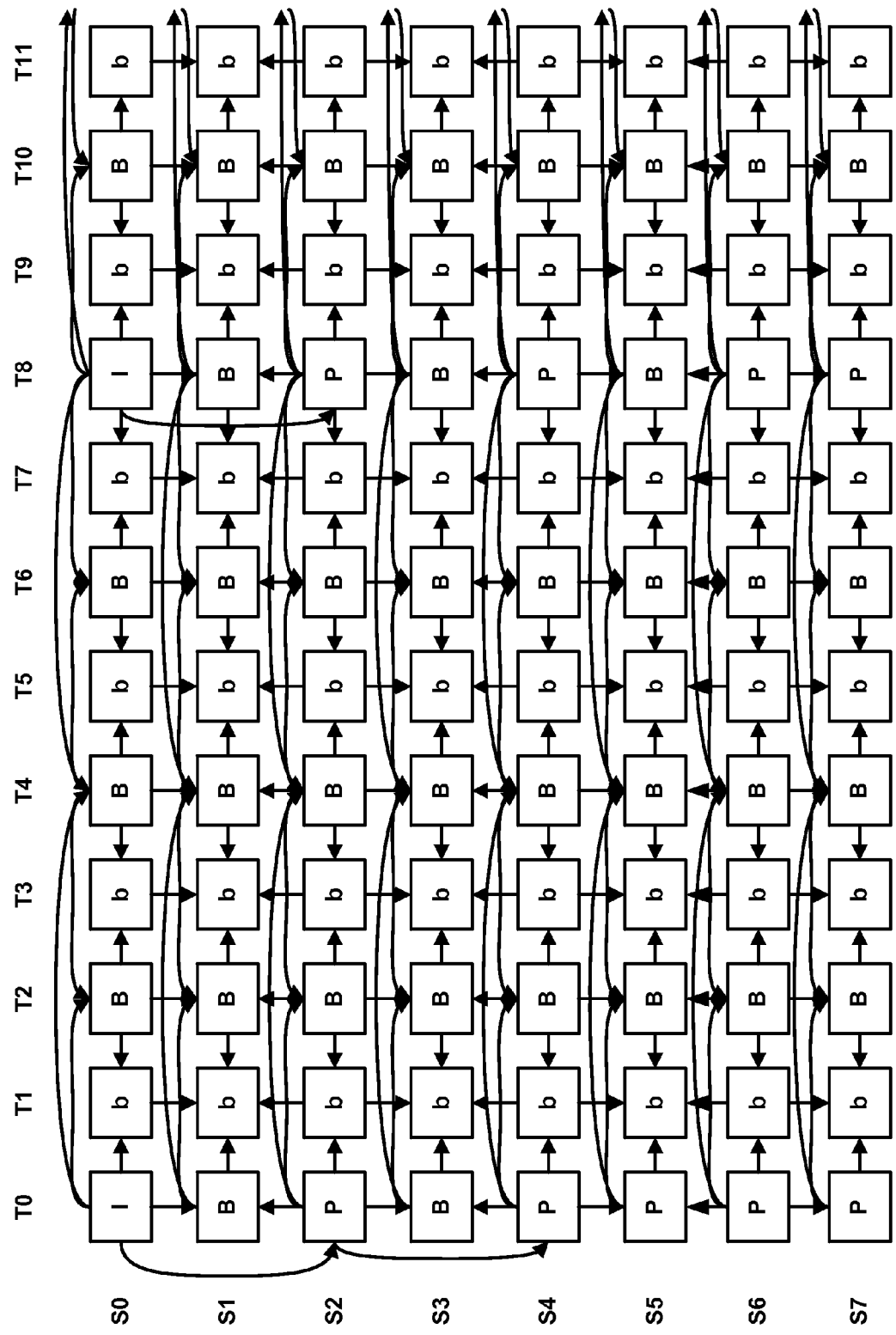
FIG. 3 is a conceptual diagram illustrating an example prediction structure for multi-view coding, according to techniques described in this disclosure.

FIG. 3 is a conceptual diagram illustrating an example prediction structure for multi-view coding, according to techniques described in this disclosure. The multi-view prediction structure of FIG. 3 includes temporal and inter-view prediction. In the example of FIG. 3, each square corresponds to a view component. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 3, view components in different views of the same access unit may be available as reference pictures. The use of one view component of an access unit as a reference picture for another view component of the same access unit may be referred to as inter-view prediction. Thus, a typical MVC prediction (including both inter-picture prediction within each view and inter-view prediction) structure for multi-view video coding is shown in FIG. 3, where predictions are indicated by arrows, the pointed-to object using the point-from object for prediction reference.

In the MVC extension of H.264/AVC, inter-view prediction may be supported by disparity motion compensation, which uses the syntax of the H.264/AVC motion compensation, but allows a picture in a different view to be used as a reference picture. Coding of two views may supported also by the MVC extension of H.264/AVC. One of the advantages of the MVC extension of H.264/AVC is that an MVC encoder may take more than two views as a 3D video input and an MVC decoder may decode such a multiview representation. Consequently, any renderer with a MVC decoder may expect 3D video contents with more than two views.

In the MVC extension of H.264/AVC, inter-view prediction is allowed among pictures in the same access unit (i.e., with the same time instance). In other words, in MVC, inter-view prediction is performed among pictures captured from different views of the same access unit (i.e., with the same time instance) to remove correlation between views. When coding a picture in one of the non-base views, a picture may be added into a reference picture list, if the picture is in a different view but with a same time instance. In other words, a picture coded with inter-view prediction may be added into a reference picture list for the inter-view prediction of the other non-base views. An inter-view prediction reference picture can be put in any position of a reference picture list, just like any inter prediction reference picture.

Furthermore, in the context of multi-view video coding, there may be two types of motion vectors. One type of motion vector is a normal motion vector that points to temporal reference pictures and the corresponding temporal inter prediction is motion-compensated prediction (MCP). The other type of motion vector is a disparity motion vector that points to pictures in a different view (i.e., inter-view reference pictures) and the corresponding inter prediction is disparity-compensated prediction (DCP).

Figure 4:
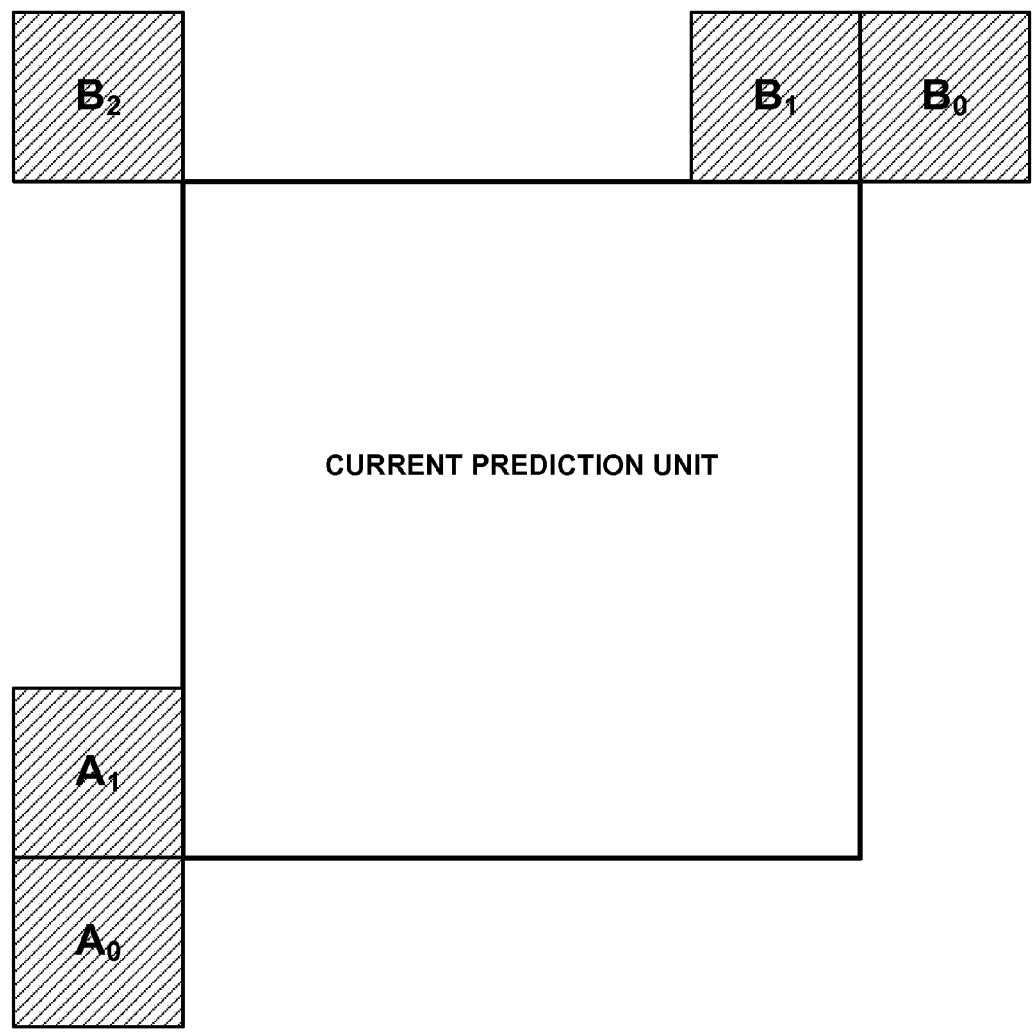
FIG. 4 is a conceptual diagram illustrating spatial neighboring blocks of a current prediction unit (PU) for neighbor-based disparity vector derivation (NBDV), according to techniques described in this disclosure.

FIG. 4 is a conceptual diagram illustrating spatial neighboring blocks of a current prediction unit (PU) for neighbor-based disparity vector derivation (NBDV), according to techniques described in this disclosure. In the current NBDV, five spatial neighboring blocks are used for the disparity vector derivation for a current PU. The five spatial neighboring blocks are the below-left, left, above-right, above and above-left blocks of current PU, as denoted by A0, A1, B0, B1, and B2. It should be noted that the five spatial neighboring blocks are the same as those used in the merge modes in HEVC. Therefore, no additional memory access is required.

For checking temporal neighboring blocks, a construction process of a candidate picture is performed first. Up to two reference pictures from current view may be treated as candidate pictures. A co-located reference picture is first inserted to the candidate picture list, followed by the rest of candidate pictures in the ascending order of reference index. When the reference pictures with the same reference index in both reference picture lists are available, the one in the same reference picture list of the co-located picture precedes the other one. For each candidate picture in the candidate picture list, three candidate regions are determined for deriving the temporal neighboring blocks.

When a block is coded with inter-view motion prediction, a disparity vector may need to be derived for selecting a corresponding block in a different view. Implicit disparity vector (IDV), also referred to as derived disparity vector, is referred as to the disparity vector derived in the inter-view motion prediction. Even though the block is coded with motion prediction, the derived disparity vector is not discarded for the purpose of coding a following block. The NBDV process may check disparity motion vectors in the temporal neighboring blocks, disparity motion vectors in the spatial neighboring blocks, and then the implicit disparity vector in order. Once, the disparity vector is found, the process is terminated.

When there is no disparity motion vector or IDV found during the previous process, the NBDV is marked as unavailable. In this case, it can be considered that the NBDV returns an unavailable disparity vector. However, even the NBDV returns unavailable result, a zero disparity vector can be used by other coding processes which require a disparity vector. 3D-HEVC allows a depth of a reference view to be accessed. In this case, the depth can be also used to refine the disparity vector or disparity motion vector to be used for backward view synthesis prediction (BVSP).

When an available disparity vector is derived from the NBDV process, it is further refined by retrieving the depth data from reference view's depth map. The refinement process includes two steps. First, a corresponding depth block is located by using the derived disparity vector in the previously coded reference depth view, such as the base view. The size of the corresponding depth block is the same as that of current PU. Second, one depth value from four corner pixels of the corresponding depth block is selected and converted to a horizontal component of the refined disparity vector. A vertical component of the disparity vector is unchanged.

The above process for deriving an available disparity vector is also called NBDV refinement (NBDV-R) or depth oriented NBDV (Do-NBDV). However, when NBDV does not provide an available disparity vector (thus, the result of NBDV is unavailable), the above NBDV-R process is skipped and a zero disparity vector is directly returned.

Note that the refined disparity vector is used for inter-view motion prediction while the unrefined disparity vector is used for inter-view residual prediction. In addition, the refined disparity vector is stored as the motion vector of one PU if it is coded with backward VSP mode.

Since HEVC introduces the concept of candidate list for AMVP and merge modes, in 3D-HEVC, inter-view motion prediction is realized by introducing new candidates. Although there were activities to change the AMVP candidate list generation, the benefit of doing that were considered small thus the AMVP mode was kept unchanged in the current 3D-HEVC. The major realization of inter-view motion prediction is achieved by modifications of the merge mode.

In 3D-HEVC, up to six merge candidates can be inserted into the merge candidate list. While maintaining the candidates inserted into the list by the decoding processes of merge mode in HEVC, two additional candidates may be added into the merge candidate list. They are the candidate derived from accessing the reference block's motion information, namely inter-view candidate and the candidate converted from the disparity vector of the current block.

The inter-view candidate is derived by reusing the motion vectors of the reference block located by the disparity vector and its associated reference view id derived from the NBDV process. Furthermore, the reference index of the merge candidate is set to identify the picture (in the reference picture list of the current picture) that is within the same access unit (time instance) as the one the motion vector points to in the reference view.

A video coder converts the disparity vector to disparity motion vector with the reference index identifying the inter-view reference picture in order to generate the other candidate. This candidate is inserted regardless of the availability of inter-view candidate. Similar to the merge process in HEVC, the video coder applies pruning to additional candidates, by comparing with only the candidates from spatial neighbors denoted by $A_1$ and $B_1$, as shown in FIG. 4.

The backward-warping VSP (BVSP) approach, as proposed in JCT3V-C0152, is the same as the block-based VSP in 3D-AVC. Both of these two techniques use the backward-warping and block-based VSP to avoid transmitting the motion vector differences and use more precise motion vectors. However, the implementation details are different due to the different platforms. The term BVSP is also used to indicate the backward-warping VSP approach in 3D-HEVC.

In 3D-HTM, texture first coding is applied in common test conditions. Therefore, the corresponding non-base depth view is unavailable when decoding one non-base texture view and the depth information is estimated and used to perform BVSP.

Figure 5:
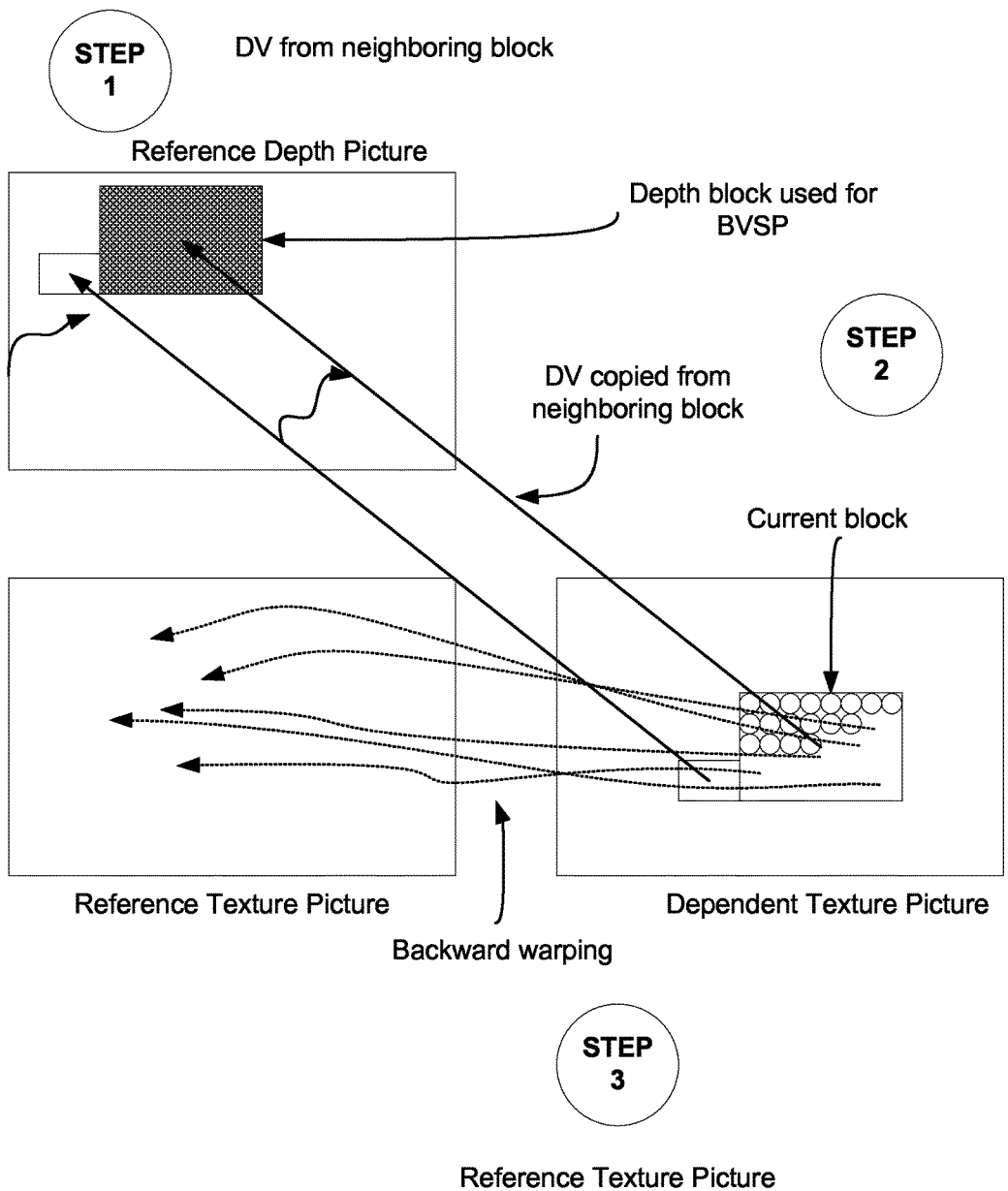
FIG. 5 is a conceptual diagram of an example visualization of depth block derivation from a reference view to do block-based view synthesis prediction (BVSP) based on backward warping, according to techniques described in this disclosure.

FIG. 5 is a conceptual diagram of an example visualization of depth block derivation from a reference view to do block-based view synthesis prediction (BVSP) based on backward warping, according to techniques described in this disclosure. FIG. 5 illuminates the three steps how a depth block from the reference view is located and then used for BVSP prediction. In order to estimate the depth information for a block, it is proposed to first derive a disparity vector from the neighboring blocks. Then, the derived disparity vector is used to obtain a depth block from a reference view. HTM 5.1 test model includes a process to derive a disparity vector predictor, known as NBDV (Neighboring Block Disparity Vector). Let (dvx, dvy) denote the disparity vector identified from NBDV function and the current block position is denoted as (blockx, blocky). A depth block may be fetched at (blockx+dvx, blocky+dvy) in the depth image of the reference view. The fetched depth block would have the same size of the current PU, and it may then be used to do backward warping for the current PU. If BVSP is enabled in the sequence, the NBDV process for inter-view motion prediction is changed.

One difference to the NBDV process when BVSP is enabled includes for each of the temporal neighboring blocks, if it uses a disparity motion vector, the disparity motion vector is returned as the disparity vector. The disparity vector is further refined as described in the refinement of NBDV with accessing depth information section.

Another difference is that for each of the spatial neighboring blocks, apply the following for reference picture list 0 and reference picture list 1 in order: If the spatial neighboring block uses a disparity motion vector, the disparity motion vector is returned as the disparity vector and it is further refined as described above. Otherwise, if the spatial neighboring block uses BVSP mode, the associated motion vector is returned as the disparity vector. The disparity vector is further refined in a similar way as described above. However, the maximum depth value is selected from all pixels of the corresponding depth block rather than four corner pixels and the vertical component of the refined disparity vector is set to 0.

Yet another difference includes that for each of the spatial neighboring blocks, if it uses an IDV, the IDV is returned as the disparity vector and it is further refined as described above. A further difference includes if no disparity motion vector is available, the refining process is not applied, and a disparity vector is derived as a zero vector.

For the disparity motion vector derivation process, for each sub-region (4×4 block) within one PU coded with BVSP mode, a corresponding 4×4 depth block is firstly located in the reference depth view with the refined disparity vector aforementioned above. Secondly, the maximum value of the sixteen depth pixels in the corresponding depth block is selected. Thirdly, the maximum value is converted to the horizontal component of a disparity motion vector. The vertical component of the disparity motion vector is set to 0.

Figure 6:
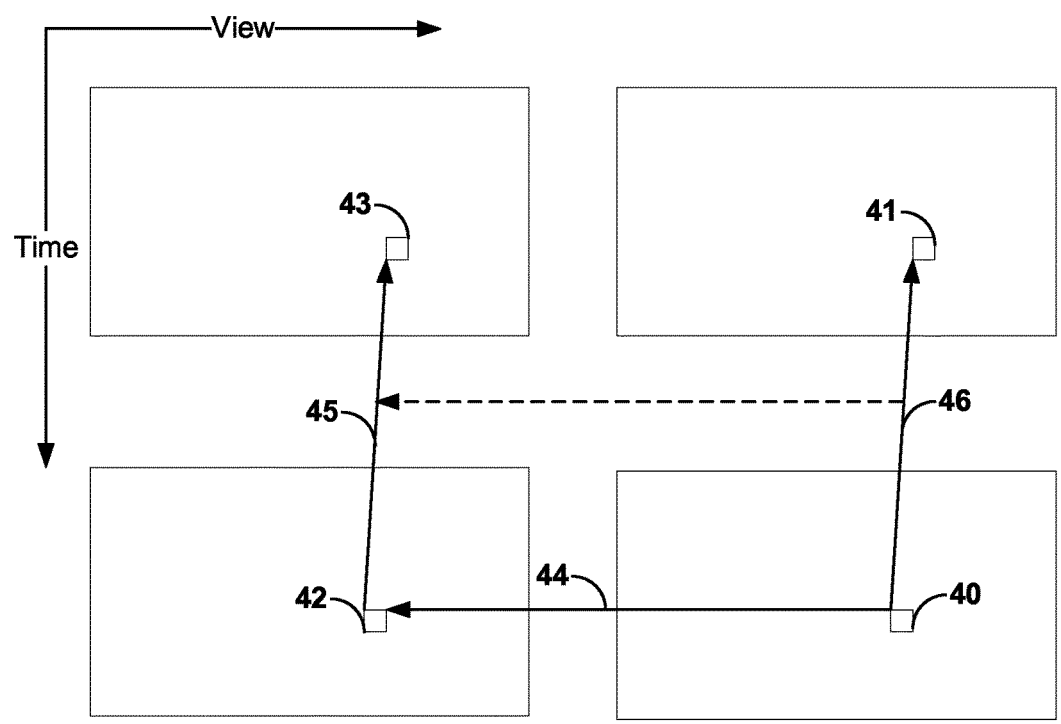
FIG. 6 is a conceptual diagram illustrating an example prediction structure of advanced residual prediction (ARP), according to techniques described in this disclosure.

FIG. 6 is a conceptual diagram illustrating an example prediction structure of advanced residual prediction (ARP), according to techniques described in this disclosure. In the current 3D-HEVC, to more efficiently utilize the correlation between the residual signal of two views, inter-view residual prediction was realized by the so-called Advanced Residual Prediction (ARP). In ARP, the residual of the reference block identified with disparity vector is generated on-the-fly, as depicted in FIG. 6, instead of maintaining a residual picture for the reference view and directly predicting the residual within the reference block in the residual picture.

As shown in FIG. 6, to better predict the residual 40 of the current block in a non-base view, the video coder may identify reference block 42 using the disparity vector 44. The motion compensation of the reference block 42 is invoked to derive the residual between the prediction signal 43 and the reconstructed signal of the reference block 42. When the ARP mode is invoked, the predicted residual is added on top of the prediction signal of the non-base view, generated by, e.g., motion compensation from the block 41 in the reference picture of the non-base view. One of the advantages of the ARP mode is that the motion vector 45 used by the reference block 42 (when generating the residue for ARP), is aligned with the motion vector 46 of the current block 40, so the residual signal of the current block can be more precisely predicted. Therefore, the energy of the residue can be significantly reduced.

Since quantization difference between base (e.g., reference) and non-base views may lead to less prediction accuracy, two weighting factors may be adaptively applied to the residue generated from the reference view: 0.5 and 1.

Since additional motion compensation at the base (e.g., reference) view may require significant increase of memory access and calculations, several methods to make the design more practical with minor sacrifice of coding efficiency may be implemented. Firstly, ARP mode is only enabled when the PU is coded with 2N×2N to reduce the computations especially at the encoder, such as video encoder 20. Secondly, bi-linear filters may be used for the motion compensation of both the reference block and the current block to significantly reduce the memory access for blocks coded with the ARP mode. Thirdly, to improve the cache efficiency, although motion vectors may point to different pictures in the non-base view, the reference picture in the base view is fixed. In this case, the motion vector of the current block may need to be scaled based on the picture distances.

Figure 7:
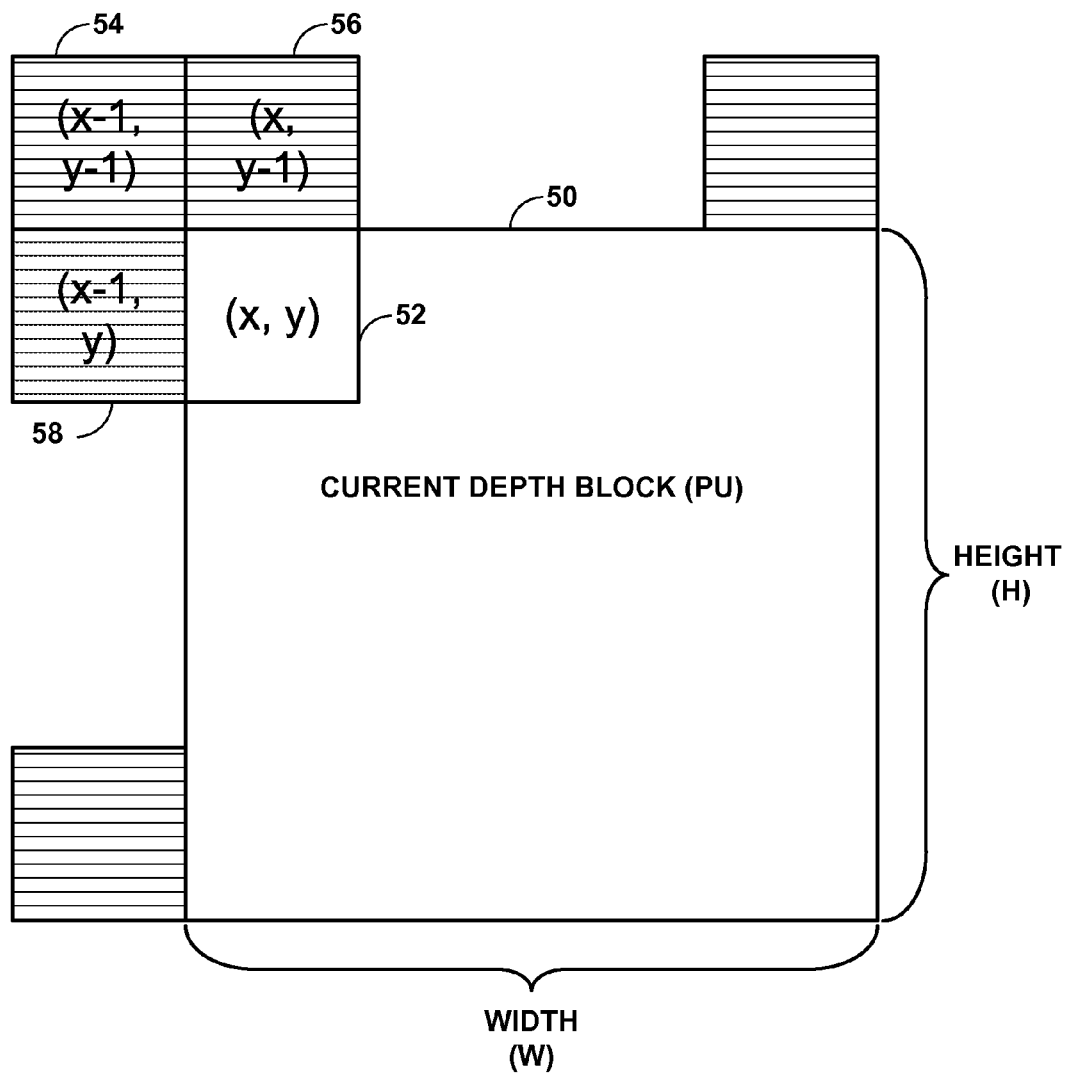
FIG. 7 is a conceptual diagram illustrating example reference samples used to derive a disparity vector of a current depth block, according to techniques described in this disclosure.

FIG. 7 is a conceptual diagram illustrating example reference samples used to derive a disparity vector of a current depth block, according to techniques described in this disclosure. FIG. 7 includes a current depth block 50 corresponding to a current PU. Current depth block 50 has a width W and a height H. Three neighboring reference samples are illustrated for the current depth block.

In one example, a top-left neighboring sample 54 of the current depth block 50 is selected. As shown in FIG. 7, the top-left neighboring sample 54 has a coordination of (x−1, y−1) if the top-left sample 52 within current depth block 50 has a coordination of (x, y). Alternatively, any sample located at the top neighboring row or left neighboring column of current depth block 50 may be used. Alternatively, any sample located at the spatial neighboring blocks of current depth block 50 may be used.

Alternatively, when current depth block 50 is being coded, more than one available neighboring samples may be used to derive one or more disparity vectors for the current depth block 50. For example, another top sample 56, with coordination (x, y−1) and another left sample 58 with coordination (x−1, y) may be used. Alternatively, samples with coordination of (x−1, y+1) and (x+1, y−1) may be used. Alternatively, samples with coordination of (x−1, y+H−1) and (x+W−1, y−1) may be used if current depth block 50's size is denoted by W×H, as the left neighboring corner or top neighboring corner shown in FIG. 7. Alternatively, any samples of the top neighboring row of the current depth block 50 may be used. Alternatively, any samples of the left neighboring column of current depth block 50 may be used. Alternatively, any samples of the spatial neighboring blocks of current depth block 50 may be used.

Other alternatives may apply to the block-level disparity vector derivation, if applicable to CU-level and PU-level solutions mentioned above. When more than one neighboring depth samples are used to derive the disparity vector, one sample may be chosen through one of the following means. First, an index may be signaled in the block (PU or CU) level indicating which of the multiple samples is chosen to be converted to a disparity vector.

Second, a number of disparity vectors may be converted. The number may be the same as the number of depth samples. Multiple disparity vectors are used to generate predictors used for inter-view prediction. For example, multiple motion vector candidates can be generated and inserted into the merge candidate list.

Third, a mathematic function may be applied to the values of multiple depth samples, for example, median, maximum or average function, and the output value of the function is used to be converted to the unique disparity vector. For example, in CU-level disparity vector derivation process, the coordinates of the top-left sample within the CU covering current depth block 50 is denoted as (x, y) and the CU size is 2N×2N, a medium value of the three samples with coordination (x−1, y−1), (x−1, y) and (x, y−1) is used. In another example, the maximum value of five samples with coordination (x−1, y−1), (x−1, y+2N), (x−1, y+2N−1), (x+2N, y−1) and (x+2N−1, y−1) may be used.

For example, in determining the at least one disparity value, a system may determine two or more disparity values based at least in part on two or more neighboring samples of the respective CU. The top-left sample of the respective CU has the coordinates (x, y), and the two or more reconstructed depth samples are from at least two or more of a top-left neighboring sample of the respective CU, a top neighboring row of the respective CU, a left neighboring column of the respective CU, any sample located at a special neighboring block of the respective CU, a sample with coordinates (x−1, y+1), a sample with coordinates (x+1, y−1), and, when the respective CU size is denoted by 2N×2N, a sample with coordinates (x−1, y+2N−1) and a sample with coordinates (x+2N−1, y−1).

In another example of applying a mathematical function to choose the sample used to derive the disparity vector, the median value of three samples is used. For example, where the PU-level disparity vector derivation process, the coordinates of the top-left sample within the current PU is denoted as (x, y) and the PU size by W×H, the medium value of the three samples with coordination (x−1, y−1), (x−1, y) and (x, y−1) is used. In another example, the maximum value of five samples with coordination (x−1, y−1), (x−1, y+H), (x−1, y+H−1), (x+W, y−1) and (x+W−1, y−1) may be used.

For example, in determining the at least one disparity value, a system may determine two or more disparity values based at least in part on two or more neighboring samples of the respective PU. In determining the at least one disparity vector based at least in part on the at least one disparity value, the system may determine two or more disparity vectors based at least in part on the two or more disparity values. The top-left sample of the PU has the coordinates (x, y), and the two or more reconstructed depth samples are from at least two or more of a top neighboring row of the PU, a left neighboring column of the PU, any sample located at a special neighboring block of the respective CU, a sample with coordinates (x−1, y+1), a sample with coordinates (x+1, y−1), and, when the PU size is denoted by W×H, a sample with coordinates (x−1, y+H−1) and a sample with coordinates (x+W−1, y−1).

The above examples may be combined with the NBDV process used in texture view coding of 3D-HEVC. The same procedure as the NBDV process may be applied firstly. If a disparity vector is not found from the NBDV process, one of the above methods may be further applied to get a disparity vector for current depth block.

In some examples, one or more samples may be selected from the described groups only in the alternative. In other examples, one or more samples may be selected from any of the groups.

A disparity vector for a depth block may be utilized in a number of ways. For example, the disparity vector may be used to identify a reference block and the motion information of the reference block is used to predict the current motion of the current block. More specifically, the motion vector of the reference block may be used to produce a new candidate to be inserted into merge or AMVP candidate list. Additionally, a disparity vector may be used to be converted to a disparity motion vector. Such a converted candidate can be inserted into merge or AMVP candidate list. Further, a disparity vector may be used to identify a reference block from where ARP can be applied for the current depth block.

Figure 8:
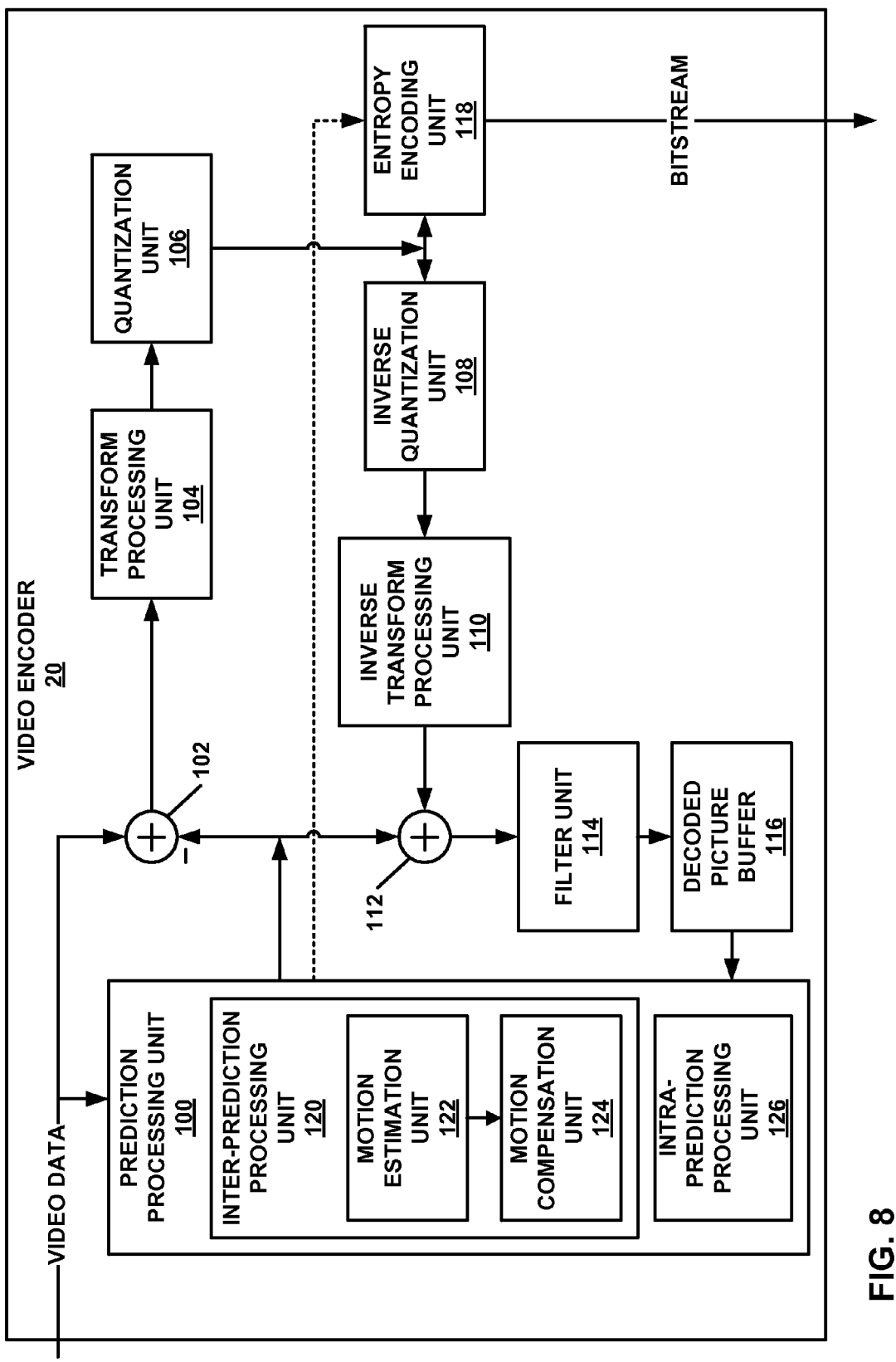
FIG. 8 is a block diagram illustrating an example video encoder that may implement the techniques described in this disclosure.

FIG. 8 is a block diagram illustrating an example video encoder 20 that may implement the techniques of this disclosure. FIG. 8 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 8, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. The size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include a predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for video blocks encoded in I-mode, the predictive block is formed using spatial prediction from previously-encoded neighboring blocks within the same frame.

PUs in a P slice may be intra predicted or uni-directionally inter predicted. For instance, if a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely corresponds to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a prediction block of the PU and a reference location associated with the reference region. For instance, the motion vector may be a two-dimensional vector that provides an offset from the coordinates in the current decoded picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

PUs in a B slice may be intra predicted, uni-directionally inter predicted, or bi-directionally inter predicted. Hence, if a PU is in a B slice, the motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a sample block of the PU. The motion information of the PU may include the reference indexes and the MVs of the PU. Motion compensation unit 124 may generate the predictive blocks of the PU based at least in part on actual or interpolated samples at the reference region indicated by the motion vector of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may generate a predictive block for a PU based on samples of neighboring PUs. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes. In some examples, the number of intra prediction modes may depend on the size of the prediction blocks of the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding blocks of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Techniques of this disclosure may be performed by elements of a video encoder, such as residual generation unit 102 of video encoder 20, although, in other examples, other elements of video encoder 20, either pictured or not pictured in FIG. 8, may perform techniques of this disclosure. In this technique, for each prediction unit of a respective coding unit of a slice of a picture of video data, residual generation unit 102 may determine at least one disparity value based at least in part on at least one depth value of at least one reconstructed depth sample of at least one neighboring sample. Residual generation unit 102 may determine at least one disparity vector based at least in part on the at least one disparity value, wherein the at least one disparity vector is for the respective coding unit. Residual generation unit 102 may generate an encoded representation of a coding block for the respective coding unit based at least in part on the at least one disparity vector.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU. The bitstream may also include syntax elements that are not entropy encoded.

Figure 9:
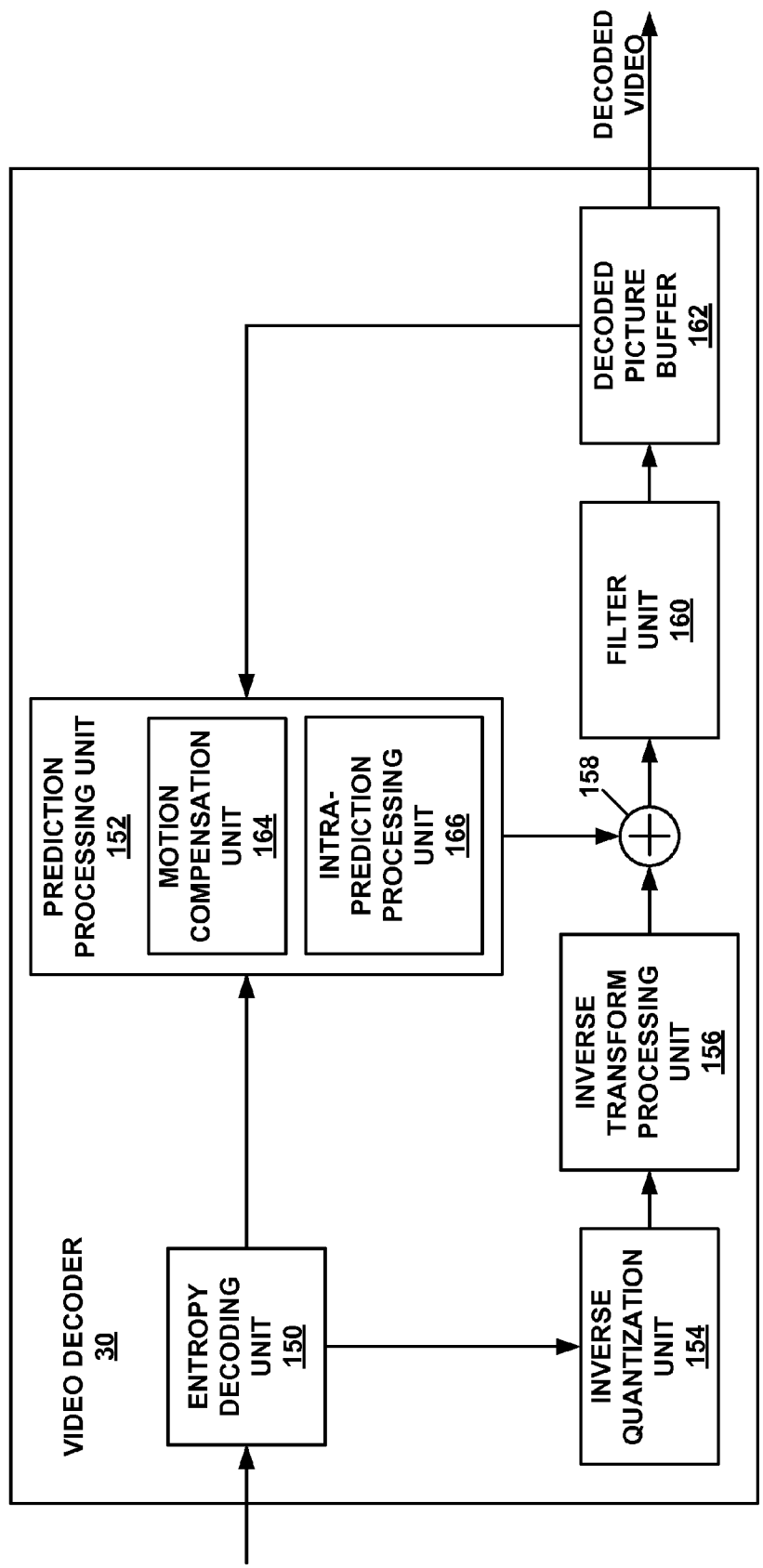
FIG. 9 is a block diagram illustrating an example video decoder that may implement the techniques described in this disclosure.

FIG. 9 is a block diagram illustrating an example video decoder 30 that may implement the techniques described in this disclosure. FIG. 9 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 9, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Entropy decoding unit 150 may receive NAL units and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform reconstruction operations on CUs. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Techniques of this disclosure may be performed by reconstruction unit 158 of video decoder 30, although, in other examples, other elements of video decoder 30, either pictured or not pictured in FIG. 9, may perform techniques of this disclosure. For each prediction unit of a respective coding unit of a slice of a picture of video data, reconstruction unit 158 may determine at least one disparity value based at least in part on at least one depth value of at least one reconstructed depth sample of at least one neighboring sample. Reconstruction unit 158 may determine at least one disparity vector based at least in part on the at least one disparity value, wherein the at least one disparity vector is for the respective coding unit. Reconstruction unit 158 may reconstruct a coding block for the respective coding unit based at least in part on the a least one disparity vector.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs. In this way, video decoder 30 may parse, from the bitstream, transform coefficient levels of the luma coefficient block, inverse quantize the transform coefficient levels, apply a transform to the transform coefficient levels to generate a transform block, generate, based at least in part on the transform block, a coding block, and output the coding block for display.

Figure 10:
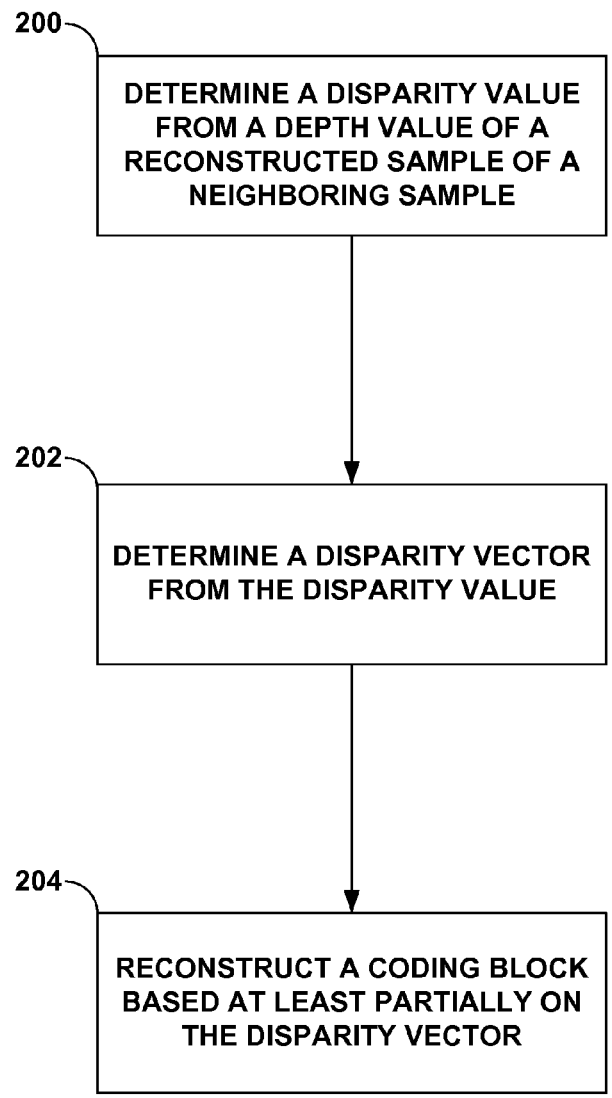
FIG. 10 is a flow diagram illustrating an example decoding technique in accordance with one or more aspects in this disclosure.

FIG. 10 is a flow diagram illustrating an example decoding technique in accordance with one or more aspects in this disclosure. This technique may be performed by elements of a video decoder, such as reconstruction unit 158 of video decoder 30. In this technique, for each prediction unit of a respective coding unit of a slice of a picture of video data, reconstruction unit 158 may determine at least one disparity value based at least in part on at least one depth value of at least one reconstructed depth sample of at least one neighboring sample (200). Reconstruction unit 158 may determine at least one disparity vector based at least in part on the at least one disparity value, wherein the at least one disparity vector is for the respective coding unit (202). Reconstruction unit 158 may reconstruct a coding block for the respective coding unit based at least in part on the a least one disparity vector (204).

Figure 11:
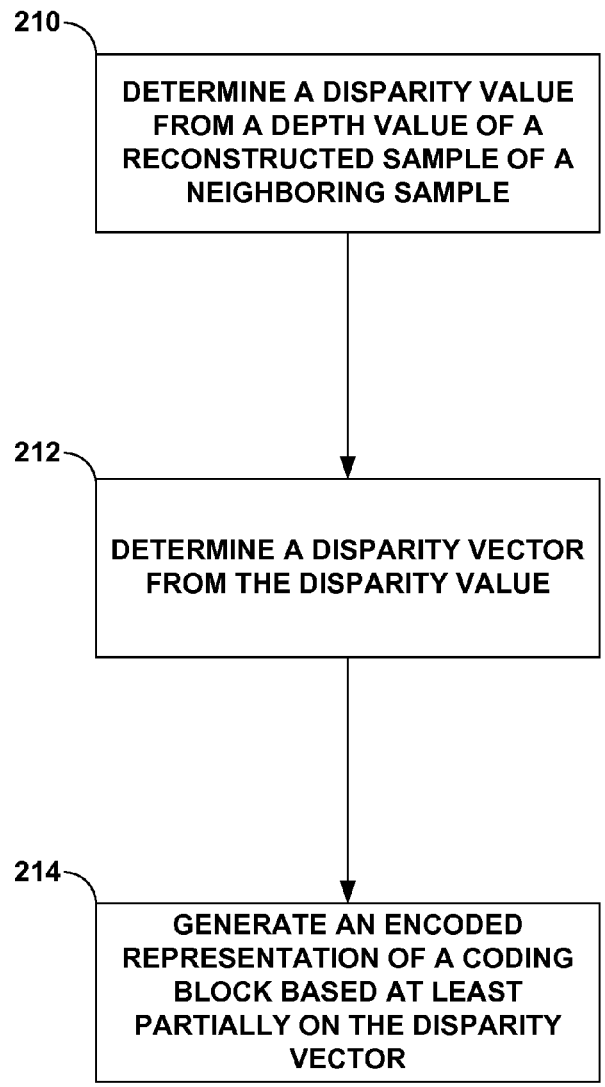
FIG. 11 is a flow diagram illustrating an example encoding technique in accordance with one or more aspects in this disclosure.

FIG. 11 is a flow diagram illustrating an example encoding technique in accordance with one or more aspects in this disclosure. This technique may be performed by elements of a video encoder, such as residual generation unit 102 of video encoder 20. In this technique, for each prediction unit of a respective coding unit of a slice of a picture of video data, residual generation unit 102 may determine at least one disparity value based at least in part on at least one depth value of at least one reconstructed depth sample of at least one neighboring sample (210). Residual generation unit 102 may determine at least one disparity vector based at least in part on the at least one disparity value, wherein the at least one disparity vector is for the respective coding unit (212). Residual generation unit 102 may generate an encoded representation of a coding block for the respective coding unit based at least in part on the at least one disparity vector (214).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. These and other examples are within the scope of the following claims.

The invention claimed is:

1. A method of decoding depth view data, the method comprising:
   for a current depth prediction unit (PU) of a respective depth coding unit (CU) of a slice of a depth picture of the depth view data:
      determining at least one disparity value based at least in part on at least one depth value of at least one reconstructed depth sample of at least one spatially neighboring depth sample, wherein the at least one spatially neighboring depth sample is outside of the current depth PU;
      determining at least one disparity vector based at least in part on the at least one disparity value, wherein the at least one disparity vector is for the respective depth CU; and
      reconstructing, based at least in part on the at least one disparity vector, a coding block for the respective depth CU.

2. The method of claim 1, wherein determining the at least one disparity vector comprises determining, based at least in part on two or more spatially neighboring depth samples, one disparity vector, the method further comprising:
   selecting one spatially neighboring depth sample of the two or more spatially neighboring depth samples based on at least one of:
      determining an index value identifying the selected spatially neighboring depth sample, wherein the index value is signaled at a block level,
      applying a mathematical function to the values of the two or more spatially neighboring depth samples to select one of the two or more spatially neighboring depth samples.

3. The method of claim 1, wherein determining the at least one disparity vector comprises determining, based at least in part on two or more spatially neighboring depth samples, two or more disparity vectors, the method further comprising:
   converting two or more disparity values into the two or more disparity vectors based on the two or more spatially neighboring depth samples.

4. The method of claim 1, further comprising:
   converting the at least one disparity vector into at least one disparity motion vector.

5. The method of claim 1, wherein determining the at least one disparity value further comprises determining two or more disparity values based at least in part on two or more spatially neighboring samples outside of the current depth PU, wherein determining the at least one disparity vector based at least in part on the at least one disparity value further comprises determining two or more disparity vectors based at least in part on the two or more disparity values, wherein a top-left sample of the current depth PU has the coordinates (x, y), and wherein the two or more reconstructed depth samples are from at least two or more of:
   a top-left neighboring sample of the current depth PU,
   a top neighboring row of the current depth PU,
   a left neighboring column of the current depth PU,
   any sample located at a special neighboring block of the respective current depth PU,
   a sample with coordinates (x−1, y+1),
   a sample with coordinates (x+1, y−1), and, when the depth PU size is denoted by W×H, a sample with coordinates (x−1, y+H−1) and a sample with coordinates (x+W−1, y−1).

6. The method of claim 5, wherein determining the at least one disparity value further comprises determining two or more disparity values based at least in part on two or more spatially neighboring samples outside of the respective depth CU, wherein a top-left sample of the respective depth CU has the coordinates (x, y), and wherein the two or more reconstructed depth samples are from at least two or more of:
 a top-left neighboring sample of the respective depth CU,
 a top neighboring row of the respective depth CU,
 a left neighboring column of the respective depth CU,
 any sample located at a special neighboring block of the respective depth CU,
 a sample with coordinates (x−1, y+1),
 a sample with coordinates (x+1, y−1), and,
 when the respective depth CU size is denoted by 2N×2N, a sample with coordinates (x−1, y+2N−1) and a sample with coordinates (x+2N−1, y−1).

7. The method of claim 5, wherein the two or more spatially neighboring samples are spatially neighboring samples of a largest coding unit (LCU) of the current depth PU.

8. The method of claim 1, wherein the at least one spatially neighboring sample is a neighbor outside of the respective depth CU when the current depth PU comprises a top-left sample of the respective depth CU.

9. The method of claim 1, wherein the at least one reconstructed depth sample is from at least one of:
 a top-left neighboring sample of the current depth PU,
 a top neighboring row of the current depth PU,
 a left neighboring column of the current depth PU, and
 any sample located at a special neighboring block of the current depth PU.

10. The method of claim 1, wherein determining the at least one disparity vector is responsive to a performed neighbor-based disparity vector derivation (NBDV) process that failed to identify any available disparity vector.

11. The method of claim 1, further comprising:
 identifying a reference block based on the at least one disparity vector;
 predicting current motion of the current depth PU based at least in part on a motion vector and a reference index of the identified reference block; and
 inserting a candidate determined based at least in part on the motion vector and reference index into a merge or advanced motion vector prediction (AMVP) candidate list.

12. The method of claim 1, wherein determining the at least one disparity vector comprises determining, based at least in part on camera parameters, the disparity vector.

13. The method of claim 12, wherein the one or more camera parameters include a horizontal displacement of two views.

14. A device for decoding video data, comprising:
 a memory configured to store data associated with a picture of depth view data; and
 one or more processors in communication with the memory and configured to:
  for a current depth prediction unit (PU) of a respective depth coding unit (CU) of a slice of the picture of depth view data:
   determine at least one disparity value based at least in part on at least one depth value of at least one reconstructed depth sample of at least one spatially neighboring sample, wherein the at least one spatially neighboring sample is outside of the current depth PU;
   determine at least one disparity vector based at least in part on the at least one disparity value, wherein the at least one disparity vector is for the respective depth CU; and
   reconstruct, based at least in part on the at least one disparity vector, a coding block for the respective depth CU.

15. The device of claim 14, wherein determining the at least one disparity vector comprises the device being configured to determine, based at least in part on two or more spatially neighboring depth samples, one disparity vector, and wherein the device is further configured to:
 select one spatially neighboring depth sample of the two or more spatially neighboring depth samples based on at least one of:
  determine an index value identifying the selected spatially neighboring depth sample, wherein the index value is signaled at a block level,
 and
  apply a mathematical function to the values of the two or more spatially neighboring depth samples to select one of the two or more spatially neighboring depth samples.

16. The device of claim 14, wherein the device is further configured to:
 convert the at least one disparity vector into at least one disparity motion vector.

17. A non-transitory computer-readable storage medium having instructions stored thereon that, when executed, configure a video decoding device to:
 for a current depth prediction unit (PU) of a respective depth coding unit (CU) of a slice of a picture of the depth view data:
  determine at least one disparity value based at least in part on at least one depth value of at least one reconstructed depth sample of at least one spatially neighboring sample, wherein the at least one spatially neighboring sample is outside of the current depth PU;
  determine at least one disparity vector based at least in part on the at least one disparity value, wherein the at least one disparity vector is for the respective depth CU; and
  reconstruct, based at least in part on the at least one disparity vector, a coding block for the respective depth CU.

18. The non-transitory computer-readable storage medium of claim 17, wherein determining the at least one disparity vector comprises the instructions further configuring the device to determine, based at least in part on two or more spatially neighboring depth samples, one disparity vector, and wherein the instructions further configure the device to:
 select one spatially neighboring depth sample of the two or more spatially neighboring depth samples based on at least one of:
  determine an index value identifying the selected spatially neighboring depth sample, wherein the index value is signaled at a block level, and
  apply a mathematical function to the values of the two or more spatially neighboring depth samples to select one of the two or more spatially neighboring depth samples.

19. A method of encoding depth view data, the method comprising:

for a current depth prediction unit (PU) of a respective depth coding unit (CU) of a slice of a picture of the video data:

determining at least one disparity value based at least in part on at least one depth value of at least one reconstructed depth sample of at least one spatially neighboring sample, wherein the at least one spatially neighboring sample is outside of the current depth PU;

determining at least one disparity vector based at least in part on the at least one disparity value, wherein the at least one disparity vector is for the respective depth CU; and generating, based at least in part on the at least one disparity vector, an encoded representation of a coding block for the respective depth CU.

20. The method of claim 19, wherein determining the at least one disparity vector comprises determining, based at least in part on two or more spatially neighboring depth samples, one disparity vector, the method further comprising:

selecting one spatially neighboring depth sample of the two or more spatially neighboring depth samples based on at least one of:

determining an index value identifying the selected spatially neighboring depth sample, wherein the index value is signaled at a block level; and applying a mathematical function to the values of the two or more spatially neighboring depth samples to select one of the two or more spatially neighboring depth samples.

21. The method of claim 19, wherein determining the at least one disparity vector comprises determining, based at least in part on two or more spatially neighboring depth samples, two or more disparity vectors, the method further comprising:

converting two or more disparity values into two or more disparity vectors based on the two or more spatially neighboring depth samples.

22. The method of claim 19, further comprising:

converting the disparity vector into a disparity motion vector.

23. The method of claim 19, wherein determining the at least one disparity value further comprises determining two or more disparity values based at least in part on two or more spatially neighboring samples outside of the current depth PU, wherein determining the at least one disparity vector based at least in part on the at least one disparity value further comprises determining two or more disparity vectors based at least in part on the two or more disparity values, wherein a top-left sample of the current depth PU has the coordinates (x, y), and wherein the two or more reconstructed depth samples are from at least two or more of:

a top-left neighboring sample of the current depth PU,
a top neighboring row of the current depth PU,
a left neighboring column of the current depth PU,
any sample located at a special neighboring block of the respective depth CU,
a sample with coordinates (x−1, y+1),
a sample with coordinates (x+1, y−1), and,
when the depth PU size is denoted by W×H, a sample with coordinates (x−1, y+H−1) and a sample with coordinates (x+W−1, y−1).

24. The method of claim 23, wherein determining at least one disparity value further comprises determining two or more disparity values based at least in part on two or more spatially neighboring samples outside of the respective depth CU, wherein a top-left sample of the respective depth CU has the coordinates (x, y), and wherein the two or more reconstructed depth samples are from at least two or more of:

a sample with coordinates (x−1, y+1),
a sample with coordinates (x+1, y−1), and,
when the respective depth CU size is denoted by 2N×2N, a sample with coordinates (x−1, y+2N−1) and a sample with coordinates (x+2N−1, y−1).

25. The method of claim 23, wherein the two or more spatially neighboring samples are spatially neighboring samples of a largest coding unit (LCU) of the current depth PU.

26. The method of claim 19, wherein the at least one reconstructed depth sample is from at least one of:

a top-left neighboring sample of the current depth PU,
a top neighboring row of the current depth PU,
a left neighboring column of the current depth PU, and
any sample located at a special neighboring block of the current depth PU.

27. The method of claim 19, wherein determining the at least one disparity vector is responsive to a performed neighbor-based disparity vector derivation (NBDV) process that failed to identify any available disparity vector.

28. The method of claim 19, further comprising:

identifying a reference block based on the disparity vector;

predicting current motion of the current depth PU based at least in part on a motion vector and a reference index of the identified reference block; and inserting a candidate determined based at least in part on from the motion vector and a reference index into a merge or advanced motion vector prediction (AMVP) candidate list.

29. The method of claim 19, wherein determining a disparity vector based at least in part on the disparity value further comprises determining the disparity vector based at least in part on the disparity value and camera parameters.

30. The method of claim 29, wherein the one or more camera parameters include a horizontal displacement of two views.

* * * * *